US00RE47474E

(19) United States
(12) Reissued Patent
Fleming, III

(10) Patent Number: US RE47,474 E
(45) Date of Reissued Patent: Jul. 2, 2019

(54) INTELLIGENT BALLISTIC PARACHUTE SYSTEM THAT PERFORMS PRE-ACTIVATION AND/OR POST-ACTIVATION ACTIONS

(71) Applicant: Hoyt A. Fleming, III, Boise, ID (US)

(72) Inventor: Hoyt A. Fleming, III, Boise, ID (US)

(21) Appl. No.: 15/836,885

(22) Filed: Dec. 10, 2017

Related U.S. Patent Documents

Reissue of:
(64) Patent No.: 8,100,365
Issued: Jan. 24, 2012
Appl. No.: 12/368,911
Filed: Feb. 10, 2009

U.S. Applications:
(63) Continuation-in-part of application No. 12/352,683, filed on Jan. 13, 2009, now Pat. No. 8,056,861.

(51) Int. Cl.
*B64D 17/00* (2006.01)
*B64D 17/34* (2006.01)
*B64D 17/72* (2006.01)
*B64C 13/04* (2006.01)

(52) U.S. Cl.
CPC ..... *B64D 17/343* (2013.01); *B64C 13/04* (2013.01); *B64D 17/725* (2013.01)

(58) Field of Classification Search
None
See application file for complete search history.

(56) References Cited

U.S. PATENT DOCUMENTS 1,823,799 A * 9/1931 Friedrich ..... B64D 25/12 244/139
1,916,340 A * 7/1933 Softis ..... B64D 25/12 244/139
2,665,093 A * 1/1954 Raiti ..... B64D 25/12 244/139
3,107,887 A * 10/1963 Dixon ..... B64D 25/12 244/139
3,160,374 A * 12/1964 Raiti ..... B64D 25/12 244/138 R
3,315,920 A * 4/1967 Caughron ..... B64D 25/12 244/139
3,344,665 A * 10/1967 Anthony ..... B64D 43/00 116/280
3,352,519 A * 11/1967 Hibi ..... B64D 17/00 244/139
3,499,623 A * 3/1970 Ferguson ..... B64D 17/80 244/139
3,833,088 A * 9/1974 Chacko ..... B64D 25/14 182/48

(Continued)

FOREIGN PATENT DOCUMENTS

WO WO2007092015 * 8/2007

*Primary Examiner* — Glenn K Dawson

(57) ABSTRACT

An aircraft, the aircraft including a whole-aircraft ballistic parachute that is coupled to the aircraft. The aircraft determines if a pre-activation action needs to be performed before activation of the whole-aircraft ballistic parachute. The aircraft also receives a whole-aircraft ballistic parachute activation request. The aircraft then issues a command to perform the pre-activation action and then activates the deployment of the whole-aircraft ballistic parachute. The aircraft then issues a command to perform a post-activation action.

137 Claims, 12 Drawing Sheets

(56) References Cited

U.S. PATENT DOCUMENTS 3,905,060 A * 9/1975 Higgs ..... B63C 7/26 441/10
4,050,657 A * 9/1977 Murphy ..... B64D 17/80 244/139
4,093,920 A * 6/1978 Kaiser ..... H04B 1/034 342/443
4,113,208 A * 9/1978 Manfredi ..... B64D 17/80 244/139
4,441,673 A 4/1984 Muscatell ..... 244/135 R
4,445,654 A * 5/1984 Handbury ..... B64C 31/0285 244/139
4,480,807 A * 11/1984 Bowen ..... 244/139
4,863,119 A 9/1989 Case et al. ..... B64D 17/343 244/149
5,009,374 A * 4/1991 Manfredi ..... B64C 1/32 102/378
5,356,097 A * 10/1994 Chalupa ..... B64D 25/12 244/100 A
5,826,827 A * 10/1998 Coyaso ..... B64D 17/80 244/139
6,164,595 A * 12/2000 Williams ..... B64D 17/80 244/139
6,682,017 B1 * 1/2004 Giannakopoulos .... B64D 17/80 244/138 R
6,808,144 B1 10/2004 Nicolai et al. ..... 244/139
7,234,667 B1 * 6/2007 Talmage, Jr. ..... B64C 1/00 244/120
7,523,891 B2 * 4/2009 Hakki et al. ..... 244/152
7,703,720 B2 * 4/2010 Smith ..... B64D 17/343 102/387
7,871,043 B2 * 1/2011 Smith et al. ..... 244/152
8,056,861 B2 * 11/2011 Fleming, III ..... B64D 17/80 244/100 R
8,200,379 B2 * 6/2012 Manfredi ..... B64D 25/00 244/122 A
2005/0187677 A1 * 8/2005 Walker ..... B64C 13/20 701/16
2008/0087766 A1 4/2008 Leutard et al. ..... 244/102 R
2009/0014587 A1 * 1/2009 Bertani ..... B64C 3/10 244/120
2010/0004803 A1 * 1/2010 Manfredi et al. ..... B64D 25/00 701/14

* cited by examiner

INTELLIGENT BALLISTIC PARACHUTE SYSTEM THAT PERFORMS PRE-ACTIVATION AND/OR POST-ACTIVATION ACTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation-in-part of U.S. patent application Ser. No. 12/352,683, entitled "Intelligent Ballistic Parachute System with Fuel Discharge", which was filed on Jan. 13, 2009.

FIELD OF THE INVENTION

This invention relates to whole aircraft parachute systems.

BACKGROUND OF THE INVENTION

The safety of the occupants of an aircraft is of the utmost importance. Thus, aircraft manufacturers are constantly adding safety improvements to their aircraft. One of the recent aircraft safety improvements added to aircraft is a whole-aircraft ballistic parachute system. A whole-aircraft ballistic parachute is disclosed in U.S. Pat. No. 4,863,119, which is hereby incorporated by reference. According to Ballistic Recovery Systems, Inc., over 200 lives have been saved by whole-aircraft ballistic parachute systems. One embodiment of a prior art aircraft with a whole-aircraft ballistic parachute system is shown in FIG. 1. The aircraft 100 includes a fragile parachute cover 105. When the whole-aircraft parachute is deployed, a rocket fires through the cover 105 and extracts the whole-aircraft parachute from an opening under the cover. The rocket then tensions the parachute harness straps. Next, the whole-aircraft parachute partially inflates. The parachute is initially reefed by a reefing device, as shown in FIG. 3 of U.S. Pat. No. 4,863,119. Then, as shown in FIG. 4 and FIG. 5 of U.S. Pat. No. 4,863,119, the reefing device slides down the parachute suspension lines and allows the parachute canopy to fully open. After the whole-parachute inflates, the aircraft is lowered to the earth.

FIG. 2 shows a prior art whole-aircraft parachute harness. The forward straps 110 and the rear straps 115, both of which are made of a light but strong flexible material, such as KEVLAR™, couple the aircraft fuselage to a whole-aircraft parachute canopy (not shown) via the straps 120.

While the above whole-aircraft ballistic parachute system has saved many lives, the safety of aircraft occupants can still be further increased.

DETAILED DESCRIPTION OF THE INVENTION

Figure 1:
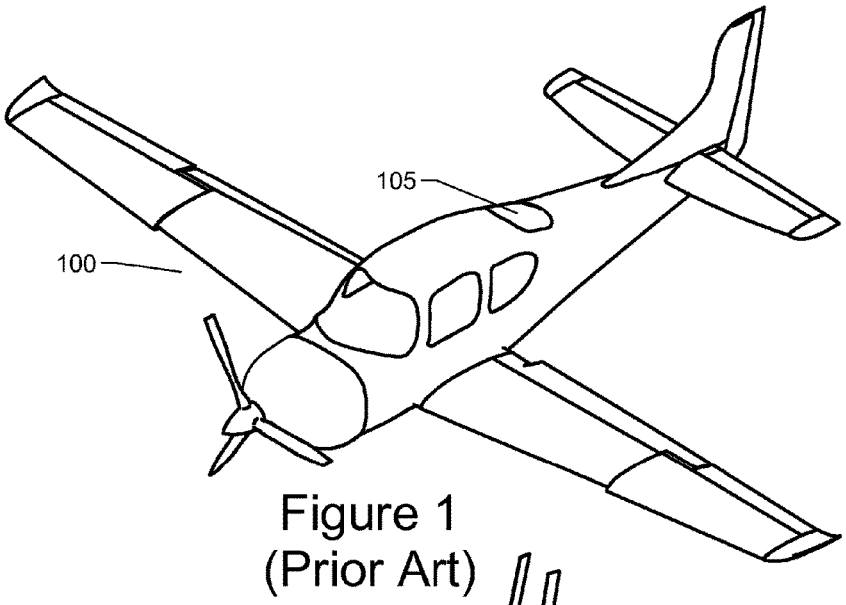
Figure 1 (Prior Art)
FIG. 1 is a view of a prior art aircraft with a whole-aircraft ballistic parachute system, which has not been deployed.
Figure 2:
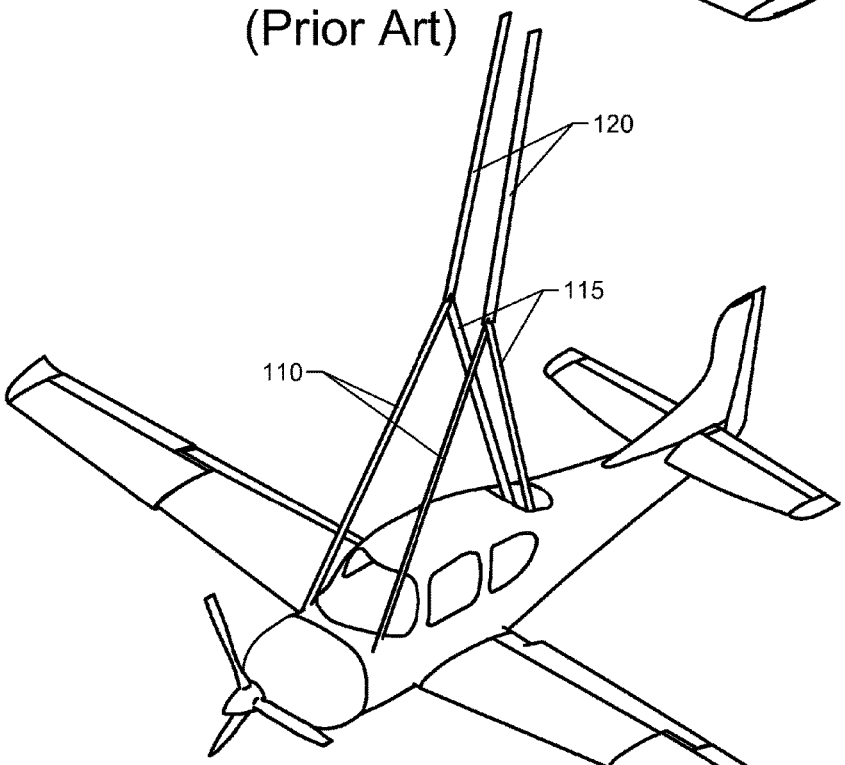
Figure 2 (Prior Art)
FIG. 2 is a view of a prior art aircraft with a whole-aircraft ballistic parachute system, which has been deployed.
Figure 3:
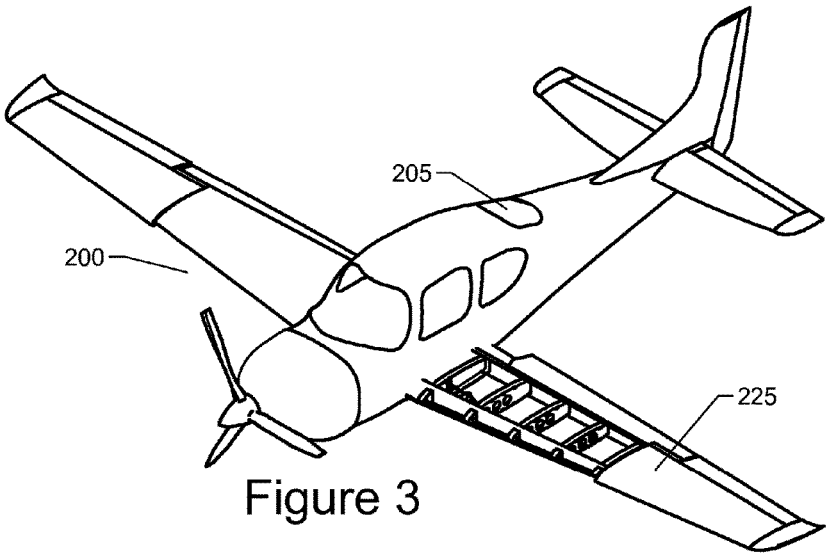
FIG. 3 is a view of one embodiment of the invention, an increased-safety aircraft, with an upper wing skin removed.
Figure 4:
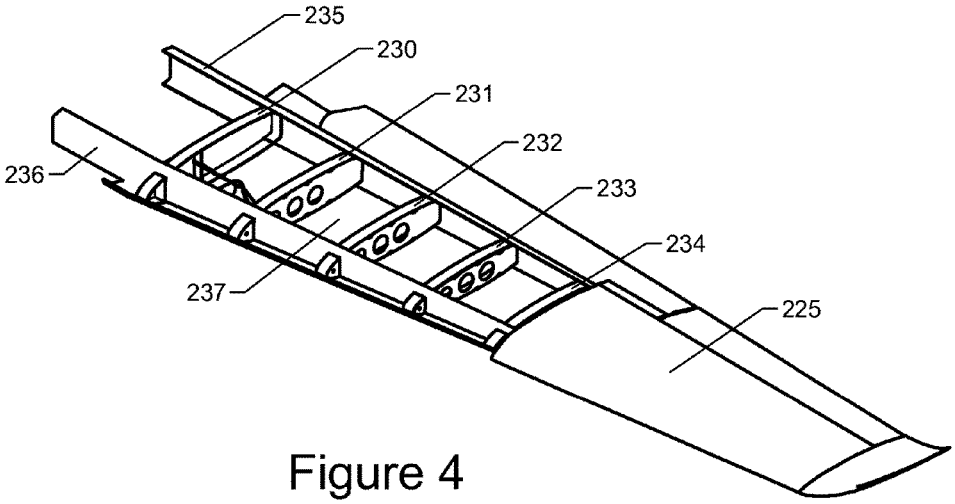
FIG. 4 is a view of the wing of FIG. 3.

FIG. 3 presents an increased-safety aircraft 200. The aircraft 200 includes a fragile whole-aircraft parachute cover 205 and a wing 225. A portion of the upper wing skin of the wing 225 has been removed so as to show various aspects of the wing 225. FIG. 4 presents a more detailed view of the wing of FIG. 3.

As can be seen in FIG. 4, the wing includes a number of ribs 230-234, a rear spar 235, a forward spar 236, and a lower wing skin 237. The inboard rib 230, the outboard rib 234, the rear spar 235, the forward spar 236, the lower wing skin 237, and the upper wing skin (not shown) form a fuel tank that stores aircraft fuel. The aircraft fuel may be 100LL aircraft fuel, jet fuel, diesel fuel, or any other aircraft fuel, such as ethanol or a high-octane automotive fuel used by some aircraft.

The intermediate ribs 231-233 contain passageways that allow a significant flow rate of aircraft fuel from outer fuel bays to the inner fuel bay, which is formed by the inner rib 230, the first intermediate rib 231, the rear spar 235, the forward spar 236, the lower wing skin 237, and the upper wing skin (not shown).

Conventional ribs contain small passageways that enable low flow rates of fuel from outer fuel bays to inner fuel bays. These conventional passageways enable the fueling of an aircraft by supplying fuel to an outer fuel bay. The fuel then slowly fills the inner fuel bay by passing through rib passageways. However, the rib passageways of FIG. 4 are significantly larger than conventional rib passageways. The passageways are sized to enable the vast majority or all of the fuel contained in the outer fuel bays to enter the inner fuel bay within a specified time. This time can be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 or greater seconds. The exact amount of time should be less than the amount of time between when the whole-aircraft parachute is activated, i.e., commanded to deploy, and when, under worst-case conditions, the aircraft contacts the earth. Thus, the intermediate rib passageways should allow for the aircraft fuel in the outer fuel bays to enter the inner fuel bay in less than the time between parachute activation and the time that the aircraft contacts the earth or an object connected to the earth.

The above-discussed specified time could be approximated to be:

Time=parachute deployment time+((minimum parachute deployment altitude above ground−altitude loss during parachute deployment)/maximum parachute descent rate)

Thus, if the parachute deployment time is 8 seconds, the minimum allowed parachute deployment altitude above ground (as specified in the aircraft's handbook) is 1000 feet, the altitude loss during parachute deployment is 920 feet, and the maximum parachute descent rate is 27 feet per second at a specified altitude, then the time could be equal to about (8 seconds+(1000 feet−920 feet)/27 feet per second) 11 seconds.

Figure 5:
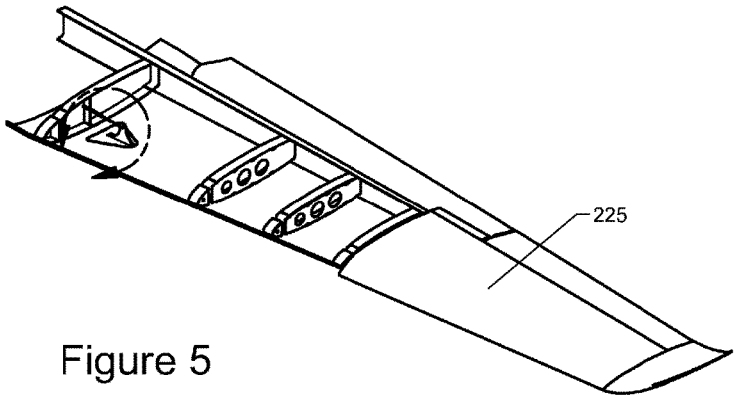
FIG. 5 is a view of the wing of FIG. 4 with the forward spar and a rib removed.
Figure 6:
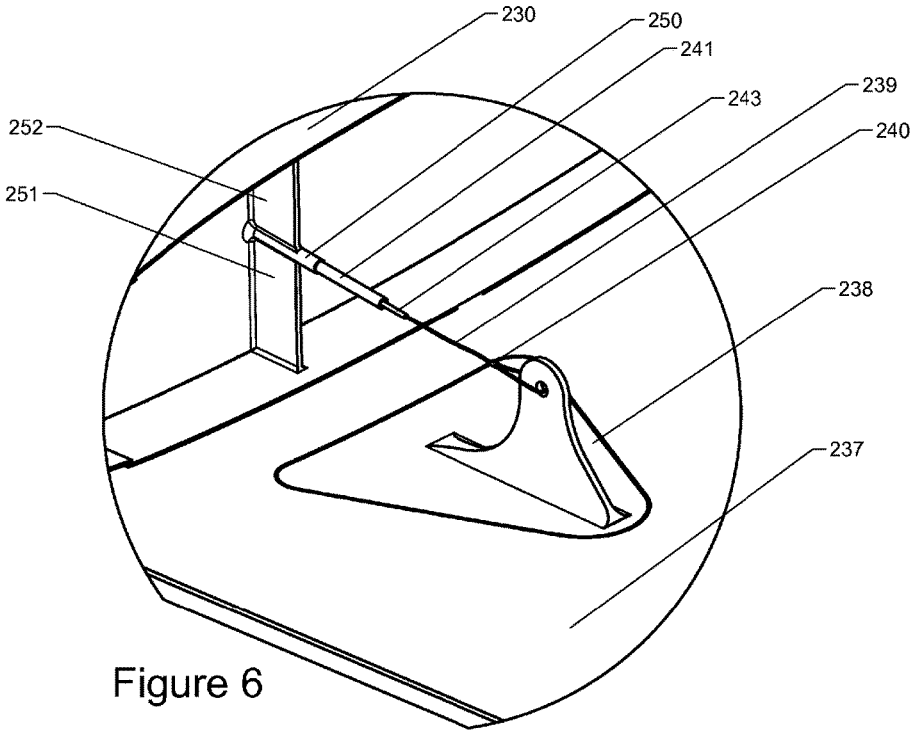
FIG. 6 is a detailed view of the wing of FIG. 5.

FIG. 5 presents the wing of FIG. 4 with the forward spar 236 and the first intermediate rib 231 removed so as to show various aspects of the wing 225. FIG. 6 presents a detailed view of a portion of the wing of FIG. 5. As can be seen in FIG. 6, a panel 238 is coupled to the lower wing skin 237.

The panel 238 shown in FIG. 6 contains a triangular base with rounded corners. The shape of the base could be a square, a rectangle, a parallelogram, a trapezoid, an octagon, or any other shape. The panel 238 shown in FIG. 6 also includes a member that is perpendicular to the base. However, the panel need not include the member shown in FIG. 6. The panel 238 could be formed from carbon fiber, fiberglass, sheet metal, and/or other structural materials.

In some embodiments of the invention, such as is shown in FIG. 6, the coupling between the lower wing skin 237 and the panel 238 is made with a breakable joint. One example of a breakable joint is a joint made from micro, i.e., epoxy that is mixed with micro-balloons. Micro-balloons are hollow bubbles that are typically microscopic in size. Micro-balloons can be obtained from www.aerocraftparts.com under the part number C-15. Another example of a breakable joint is a small surface area joint made with epoxy mixed with a structural resin filler, such as flocked cotton fiber. Flocked cotton fiber can be obtained from www.aerocraftparts.com under the part number 525. Still another breakable joint is a joint made with epoxy, micro-balloons, and a structural resin filler. In addition to or in lieu of the above discussed breakable joints, a thin low strength fiberglass cloth that is impregnated with epoxy could be used to couple the lower wing skin 237 and the panel 238. This cloth could bond the upper surfaces of the lower wing skin 237 and the panel 238. A similar low strength cloth could also bond the lower surfaces of the lower wing skin 237 and the panel 238

As shown in FIG. 6, the panel 238 is coupled to a cable 239. The cable 239 could be a 1/16" 7×7 stainless steel cable, such as the cable available from www.aircraftspruce.com under the part number 05-03500. As also shown in FIG. 6, a portion of a loop formed in the cable passes through a hole in the panel 238. The cable loop is secured by a sleeve 240, such as the nicopress sleeve available from www.aircraftspruce.com under the part number 18-1-C.

Figure 7:
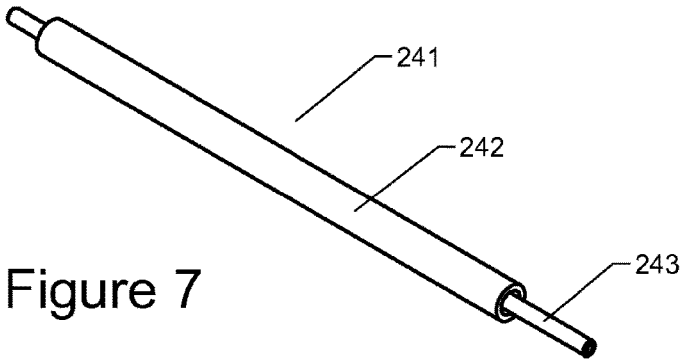
FIG. 7 is a view of a pass-through assembly of FIG. 6.

As shown in FIG. 6, the cable 239 is also coupled to a pass-through that forms a part of a pass-through assembly 241. A more detailed view of the pass-through assembly 241 is shown in FIG. 7. As shown in FIG. 7, the pass-through assembly 241 includes a tube 242 and a pass-through 243. The tube could be a 3/8" aluminum tube having an internal diameter of 0.245", which is available from www.aircraftspruce.com under the part number 03-35700.

Figure 8:
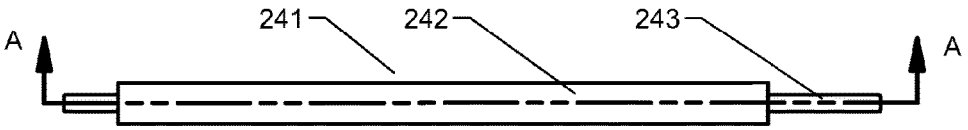
FIG. 8 is another view of the pass-through assembly of FIG. 6, showing a cross section cut out.
Figure 9:
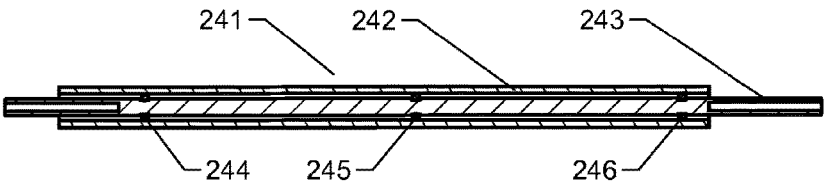
FIG. 9 is a cross-section view of the pass-through assembly of FIG. 8.

FIG. 8 presents another view of the pass-through assembly 241 that shows a cross section cutout plane A-A. FIG. 9 shows a cross section view of cutout plane A-A. FIG. 9 shows three o-rings 244-246 located between the tube 242 and the pass-through 243. O-rings 244-246 could be fuel resistant o-rings, which are available from www.aircraftspruce.com under the part number MS29513-006. In addition to the three o-rings 244-246, a small amount of a fuel resistant adhesive could be placed between the pass-through 243 and the tube 242. This adhesive could prevent pass-through 243 movement with respect to the tube 242 unless a moderate force were applied to the pass-through 243. In addition, the adhesive could provide a redundant seal for the aircraft fuel.

The axial distance between the inner o-ring 244 and the outer o-ring 246 limits the effective axial travel of the pass-through 243 with respect to the tube 242. Any travel in excess of the distance between the inner o-ring 244 and the outer o-ring 246 could allow aircraft fuel to escape the fuel tank and enter into the fuselage of the aircraft.

Figure 10:
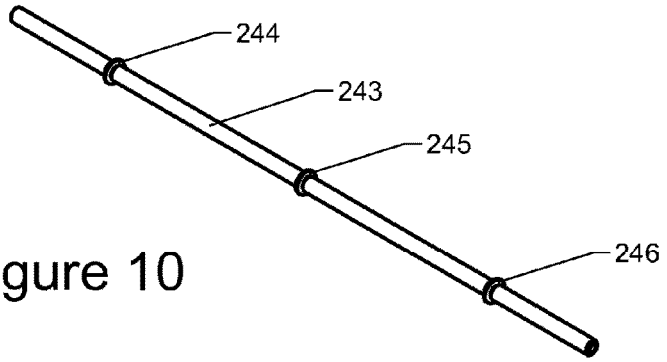
FIG. 10 is a view of a pass-through and three o-rings.

As shown in FIG. 9, each end of the pass-through 243, which may be made of stainless steel, includes a cavity. These cavities could be 1.047" deep and have a diameter of 0.078". Such cavities enable a rotary swaging tool to compress the pass-through cavities so that they firmly hold 1/16" stainless steel cables. FIG. 10 presents another view of the pass-through 243 and the three o-rings 244-246.

Figure 11:
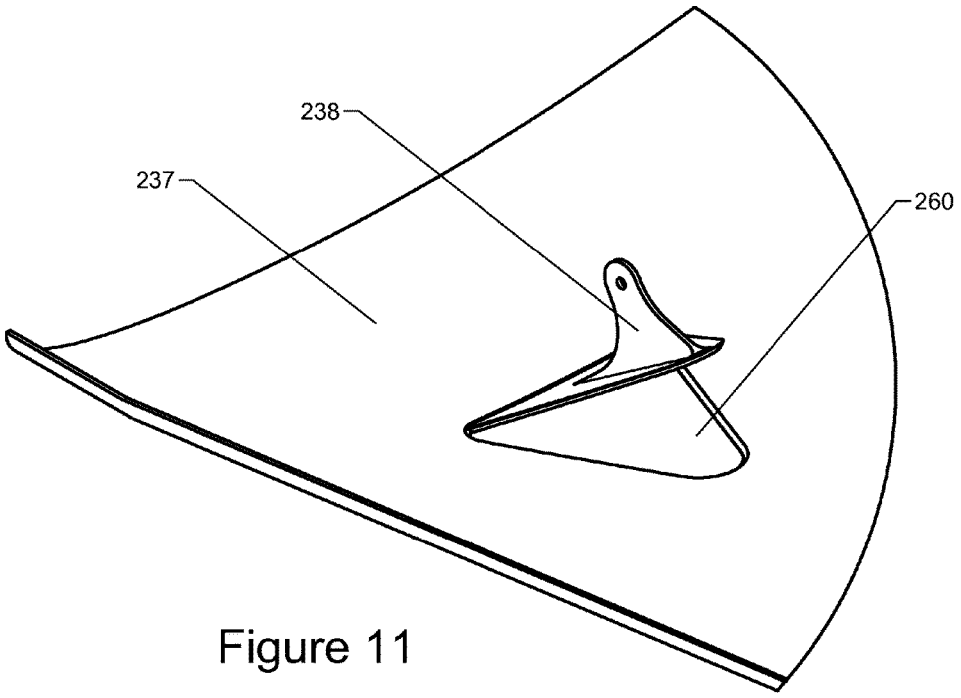
FIG. 11 is a detailed view of a lower wing skin and a rotated panel.

As shown in FIG. 6, one end of the pass-through 243 is secured to cable 239. The other end of the pass-through 243 could be coupled to either a forward parachute strap or a rear parachute strap. This coupling could be via a single cable (not shown) or via one or more of the following: cables, fasteners, push-pull tubes, bell-cranks, pulleys, and/or intermediate straps. Regardless of the components utilized, the coupling insures that when the forward parachute strap or the rear parachute strap is tensioned, the cable 239 is also tensioned. When sufficient tension is applied to cable 239, then the joint between the panel 238 and the lower wing skin 237 will be broken and then the panel 238 will move, i.e., translate and/or rotate, with respect to the lower wing skin 237. This movement will create a discharge passageway 260, as shown in FIG. 11, between the base of the panel 238 and the lower wing skin 237. The creation of the discharge passageway 260 enables the aircraft fuel to rapidly discharge through the discharge passageway 260. The discharge passageway 260 is sized to enable the vast majority or all the fuel contained in the fuel tank to discharge within a specified time. This time can be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 or greater seconds. The exact amount of time should be less than the amount of time between when the whole-aircraft parachute is activated and when, under worst-case conditions, the aircraft contacts the earth.

Referring again to FIG. 6, the tube 242 of the pass-through assembly 241 is coupled to the inner rib 230 at the inner diameter of the boss 250. This coupling, which could be an epoxy coupling, should not allow aircraft fuel to pass between the inner diameter of the boss 250 and the outer diameter of the tube 242 of the pass-through assembly 241. As shown in FIG. 6, the inner rib 230 includes two stiffeners 251 and 252 that vertically support the pass-through assembly 241. In addition, horizontal stiffeners (not shown) could be utilized to support the pass-through assembly 241 horizontally.

FIGS. 6-10 disclose one embodiment of a pass-through assembly. Many other embodiments of pass-through assemblies can be utilized. All that is required of the pass-through assembly is (1) that, before parachute activation, the pass-through assembly does not enable aircraft fuel to exit the fuel tank via the pass-through assembly and (2) that the pass-through assembly enable sufficient force be applied to panel 238 to create an aircraft fuel discharge passageway.

Figure 12:
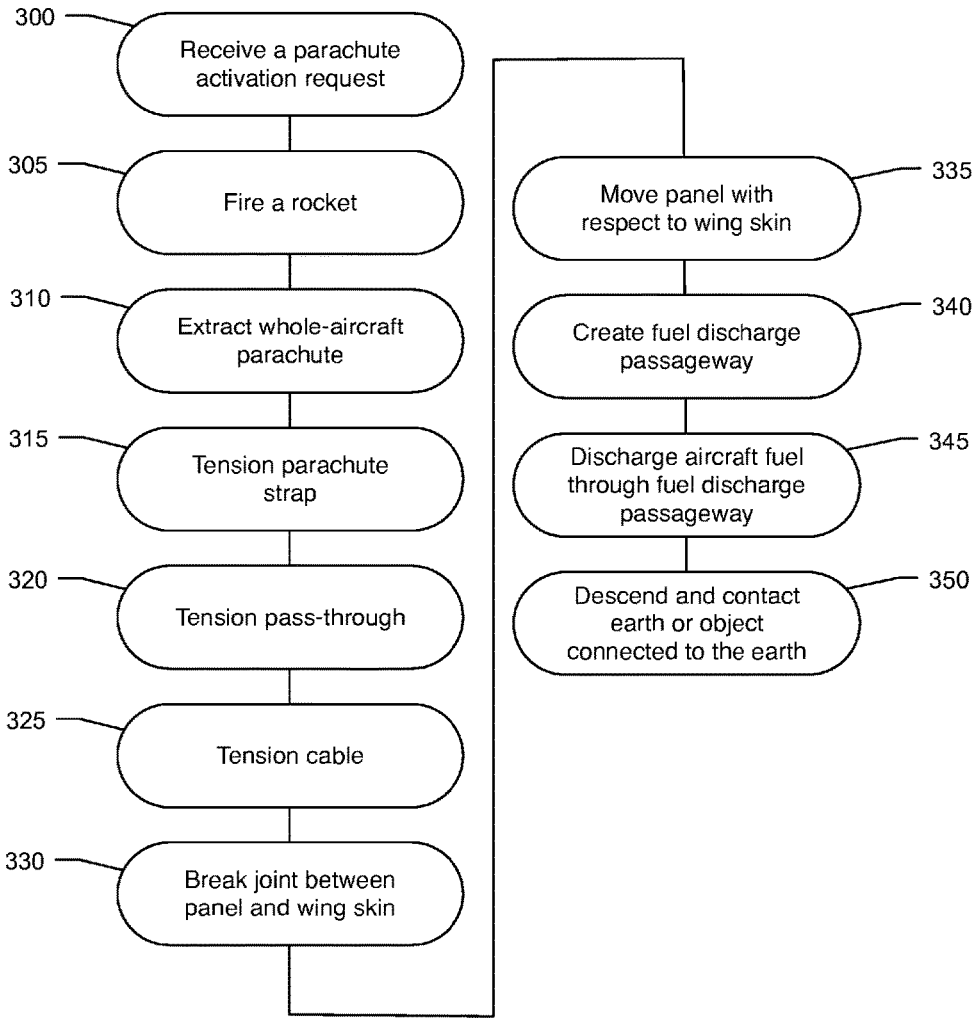
FIG. 12 is a flowchart of a method performed by an increased-safety aircraft.

One method performed by the enhanced-safety aircraft described above is the method shown in FIG. 12. First, as shown in block 300, the aircraft receives a parachute activation request. This request could result directly from an aircraft occupant pulling a parachute deployment handle. Alternatively, the request could result from a computer receiving a parachute deployment request from an aircraft occupant, performing an analysis, and then issuing a second parachute deployment request, which is received by the whole-aircraft ballistic parachute system. Then, as shown in block 305, a rocket is fired. Next, as shown in block 310, a whole-aircraft parachute is extracted. For example, the parachute could be extracted from a cavity under a fragile parachute cover. Then, as shown in block 315, a strap, such as a forward parachute strap or a rear parachute strap is tensioned. As a result of the strap tension, as shown in block 320, the pass-through 243 is tensioned. As a result of the pass-through 243 being tensioned, as shown in block 325, cable 239 is also tensioned. The tension in cable 239, as shown in block 330, causes the joint between the panel 238 and the lower wing skin 237 to break. Then, as shown in block 335, the panel 238 moves, i.e., translates and/or rotates, with respect to the lower wing skin 237. As a result of the panel's movement, as shown in block 340, a fuel discharge passageway 260 is created in the lower wing skin 237. Then, as shown in block 345, aircraft fuel discharges through the fuel discharge passageway 260. Finally, as shown in block 350, the aircraft descends and contacts the earth or an object connected to the earth, such as a tree.

One result of the above aircraft fuel discharge is that the weight of the aircraft is decreased. The weight reduction decreases the descent rate of the aircraft as the whole aircraft parachute lowers the aircraft.

The terminal velocity of a mass being lowered by a parachute is proportional to the square root of the mass. Thus, if a plane, such as a four passenger turbo-charged-piston engine plane, having an empty weight of 2225 pounds that is carrying a single 200 pound occupant and 92 gallons of fuel (weighing 664 pounds) discharges its fuel, then the descent rate of the aircraft could decrease by $[1-((2225+200)/(2225+200+552))^{0.5}]$ 10%. Similarly, if a plane, such as four passenger jet engine plane, having an empty weight of 3700 pounds that is carrying a single 200 pound occupant and 288 gallons of jet fuel (weighing 1960 pounds) discharges its fuel, then the descent rate of the aircraft could decrease by $[1-((3700+200)/(3700+200+1960))^{0.5}]$ 18%. These reductions in descent rate could significantly reduce injuries to aircraft occupants and could significantly reduce damage to the aircraft when the aircraft contacts the earth or an object connected to the earth.

In addition to reducing the descent rate of the aircraft, another significant advantage of the above systems and methods is that the aircraft fuel, which is flammable and dangerous, is separated from the aircraft and, more importantly, the aircraft occupants. By discharging the aircraft fuel when the aircraft is still airborne, the opportunity for an aircraft fuel discharge, such as because of a wing puncture during impact with the earth or an object connected to the earth, is eliminated. This risk elimination greatly increases the safety of the aircraft.

The above-described system could be very simply integrated into an aircraft. The weight penalty for such a system can be less than one pound per aircraft fuel tank. Thus, if an aircraft has a fuel tank in its left and right wings, then the total increase in weight could be less than two pounds.

While the above-described system includes only a single panel in the inner fuel bay of each wing, other embodiments could include a panel in one or more outer fuel bays. Such a system could be heavier than the above-described system. However, such a system could more rapidly discharge aircraft fuel. Still other embodiments could include a panel on the upper wing skin in the inner fuel bay (and/or outer fuel bays). This upper panel, when moved with respect to the upper wing skin, could create an air intake passageway that could provide a vent for air to enter the fuel bay when aircraft fuel is discharging. Such a vent could increase the discharge rate of fuel through a fuel discharge passageway in a lower wing skin.

The above-discussed panels could be coupled to a single pass-through via cables to minimize the weight of the system. Alternatively, multiple pass-throughs could be utilized.

The methods and systems described above could also be utilized to discharge other liquids from an aircraft. For example, the methods and systems could be utilized to discharge anti-icing liquids, such as glycol, which may be stored in wings or in the fuselage of an aircraft.

Aircraft occupant safety could be still further increased by interfacing a whole aircraft ballistic parachute, with or without a fuel/anti-icing fluid discharge system, to a computer system. One such system is shown in FIG. 13.

Figure 13:
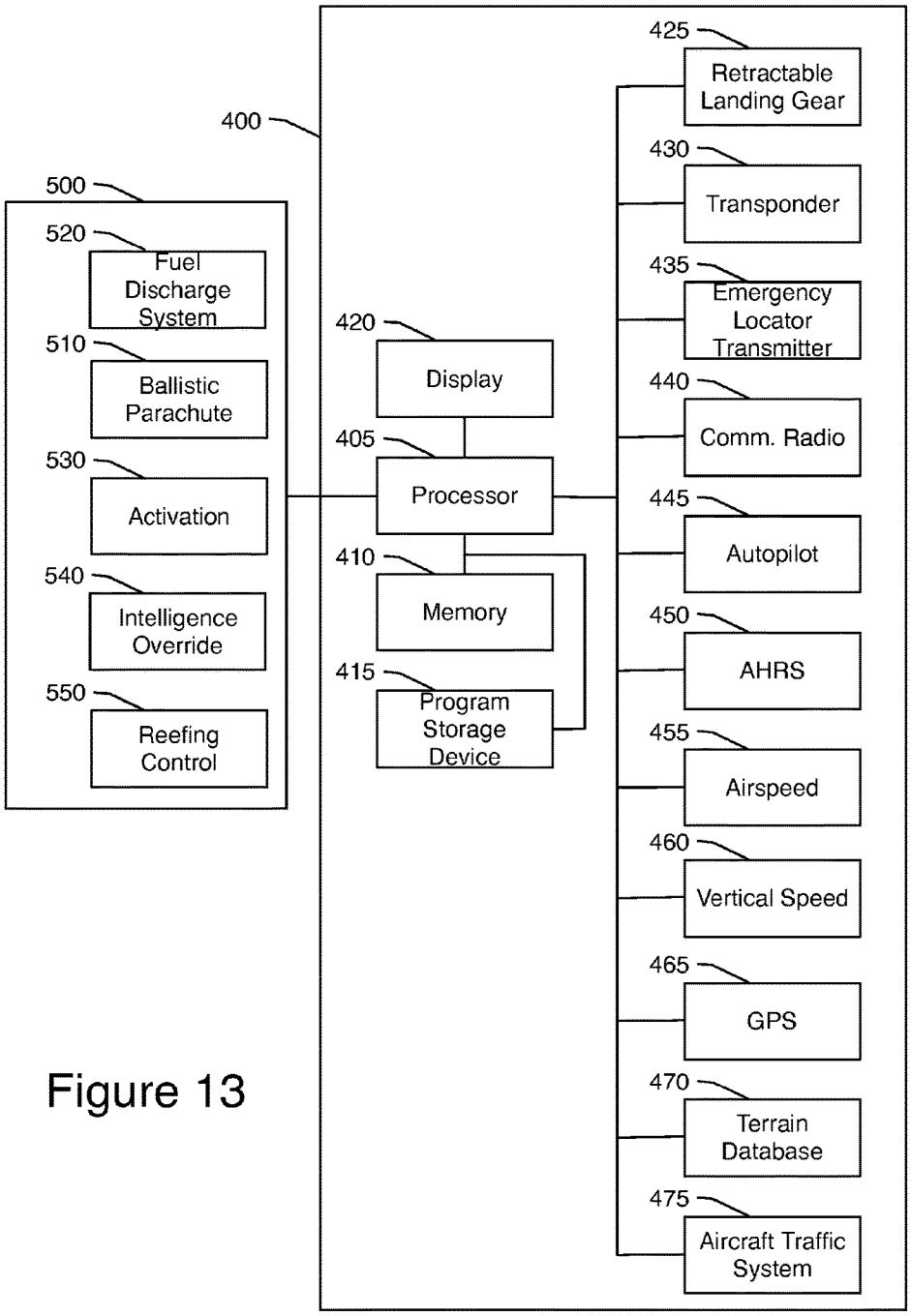
FIG. 13 is a diagram of a system for increasing the safety of aircraft occupants.

Referring to FIG. 13, the computer system 400 includes a processor 405 that is coupled to memory 410, a program storage device 415, and a display 420. The processor 405 could be an x86 instruction set compatible processor, an ARM instruction set compatible processor, or any other processor. Memory 410 could be conventional memory such as DRAM or SRAM. Program storage device 415 could be any non-volatile memory, such as FLASH memory, or a hard disk drive. Display 420 could be an LCD display, a CRT, or any conventional display.

As shown in FIG. 13, processor 405 is coupled to a number of aircraft devices 425-475. Typically, the processor could be connected to these aircraft devices 425-475 by communication interfaces (not shown). Such communication interfaces could include discrete electrical signal interfaces, serial interfaces, such as RS-232 interfaces, USB™ interfaces, FIREWIRE™ interfaces, Ethernet interfaces, $I^2C$ interfaces, or parallel interfaces. These communication interfaces are well known by those of skill in the art.

As shown in FIG. 13, the processor 405 is coupled to the retractable landing gear 425 of the aircraft. Thus, the processor could receive, typically through one or more discrete signals, data that indicates whether the retractable landing gear 425 of the aircraft is extended or refracted. In addition, the processor 405 could output data, such as a discrete signal, that causes the retractable landing gear to extend or retract.

As also shown in FIG. 13, the processor 405 is coupled to the aircraft transponder 430. Such a coupling could typically be via an RS-232 interface. The processor 405 could receive data that indicates the transponder code, which is known as the squawk code, being transmitted by the transponder. In addition, the processor could receive data that indicates whether the transponder 430 is actively transmitting responses to received radio-frequency interrogations, or whether the transponder is off or is in a standby mode. The processor 405 could also command the transponder 430 to change its transponder code to a specified code, such as the 7700 general emergency code. In addition, the processor 405 could command the transponder 430 to enter a specified mode such as Mode A, Mode C, or Mode S.

Again as shown in FIG. 13, the processor 405 is coupled to an emergency locator transmitter 435, which is also known by those of skill in the art as an ELT. This coupling could be via a discrete signal interface. Thus, the processor 405 could receive data that indicates whether the emergency locator transmitter 435 is transmitting a signal, such as a 406 MHz distress/locator signal. In addition, the processor 405 could command the emergency locator transmitter 435 to transmit a signal, such as a 406 MHz distress/locator signal, if the emergency locator transmitter 435 is not already transmitting a signal.

As shown in FIG. 13, the processor 405 is coupled to a communication radio 440. This coupling could typically be via a RS-232 interface and an audio interface. Thus, the processor 405 could receive data that indicates the frequency that the communication radio 400 is set to receive and/or transmit. In addition, the processor 405 could command the communication radio to set the receive frequency and/or transmit frequency to a specified frequency, such as the 121.5 MHz emergency frequency. Further, the processor could command the communication radio 440 to transmit a particular message on a frequency, such as the 121.5 MHz frequency. Such a message could include the aircraft type, the aircraft N number, the aircraft colors, the aircraft latitude and longitude coordinates, the aircraft altitude, the fact that a whole-aircraft parachute has been deployed, the cellular phone number of the pilot, and/or the emergency contact phone number of the pilot. In addition, the message could indicate the possible cause of the emergency, such as an aircraft/aircraft collision or an excessive acceleration as can be experienced in thunderstorms.

Again, as shown in FIG. 13, the processor is coupled to the autopilot 445. This coupling could typically be via an RS-232 interface. Thus, the processor 405 could determine the operational status of the autopilot. For example, the processor 405 could determine if the autopilot 445 is functioning properly, is engaged, and/or is operating in a particular mode, such as climb, descend, maintain altitude, maintain speed during climb, GPS track, etc. In addition, the processor 405 could command the autopilot 445 to change its operational status. Thus, the processor 405 could command the autopilot 445 to engage. Similarly, the processor 405 could command the autopilot to climb, maintain altitude, turn and/or level wings.

As shown in FIG. 13, the processor 405 is also coupled to an attitude-heading-reference-system ("AHRS") 450. This coupling is typically via an RS-232 interface. Thus, the processor could receive data that indicates the attitude of the aircraft (roll, pitch, heading) as well as the rate of change of attitude with respect to time (roll rate, pitch rate, heading rate). The AHRS 450 could also provide the processor 405 with X, Y, and Z acceleration levels. By analyzing the data received from the AHRS 450, the processor 405 could determine if an aircraft/aircraft collision has occurred. For example, if a high frequency acceleration is detected from a FFT analysis of the X, Y, and/or Z accelerations, followed by a rapid change in aircraft attitude, then it is likely that an aircraft/aircraft collision has occurred.

Again, as shown in FIG. 13, the processor 405 is coupled to an aircraft's airspeed sensor 455 and a vertical speed sensor 460. Thus, the processor 405 can receive data that indicates the aircraft's speed through the air and whether the aircraft is climbing or descending.

As shown in FIG. 13, the processor 405 is also coupled to a GPS 465. This coupling could typically be via an RS-232 interface. Thus, the processor 405 can receive data that indicates the latitude and longitude coordinates, as well as the altitude of the aircraft. In addition, as the GPS 465 may include a terrain database, the processor 405 may also receive data that indicates whether a collision with the earth or an object connected to the earth, such as a tower, is eminent.

As shown in FIG. 13, the processor 405 may also be coupled to another terrain database 470. The terrain database 470 could provide the processor 405 with detailed ground elevation for various latitude and longitude coordinates. With the use of the terrain database 470 and data from the GPS 465, the processor 405 could determine the aircraft's current altitude above ground as well as the aircraft's future altitude above the ground if the aircraft continues on it present track.

As shown in FIG. 13, the processor 405 is also coupled to an aircraft traffic system 475. This coupling could typically be via an RS-232 interface. Thus, the processor 405 could receive data that indicates the relative distance and relative altitude of other nearby aircraft. This data could be utilized, in conjunction with data received from the AHRS 450, to determine if an aircraft/aircraft collision has occurred.

As shown in FIG. 13, the processor 405 is coupled to a whole-aircraft ballistic parachute system 500. This coupling could be via a discrete signal interface, by an RS-232 interface, by an $I^2C$ interface, or by any other electrical interface. In an effort to reduce the complexity and cost of the ballistic parachute system 500, the discrete signal interface may be optimal.

The ballistic parachute system 500 shown in FIG. 13 includes a whole-aircraft ballistic parachute 510, a fuel discharge system 520, an activation interface 530, and an intelligence override interface 540. The ballistic parachute 510 is of sufficient size and strength to lower an entire aircraft to the earth. The fuel discharge system could create a fuel discharge passageway, as discussed above, when a parachute strap tensions. The ballistic parachute system's activation interface 530 could be a conventional pull-handle that activates the deployment of the ballistic parachute 510. In addition, the activation interface 530 could generate data that is sent to the processor 405 so that the processor can perform an analysis, as discussed below, to determine if any actions need to be performed before and/or after the activation of the deployment of the ballistic parachute 510. The ballistic parachute system's intelligence override interface 540 immediately activates the deployment of the ballistic parachute 510 regardless of whether the processor 405 determines that one or more actions need to be performed before the activation of the deployment of the ballistic parachute 510. Alternatively or in addition to, the intelligence override interface 540 could disable reefing control, as discussed below, so that the whole-aircraft ballistic parachute 510 could rapidly open. This intelligence override interface 540 could be a second pull of the above-discussed pull-handle, a separate pull-handle, or a button placed near the above-discussed pull-handle.

The ballistic parachute system 500 could also include a reefing control system 550. The reefing control system 550 could control the reefing of ballistic parachute 510 based upon commands received from processor 405. For example, the reefing control system 550 could control the position of a reefing device with respect to a parachute canopy based upon one or more commands received from processor 405.

Figure 17:
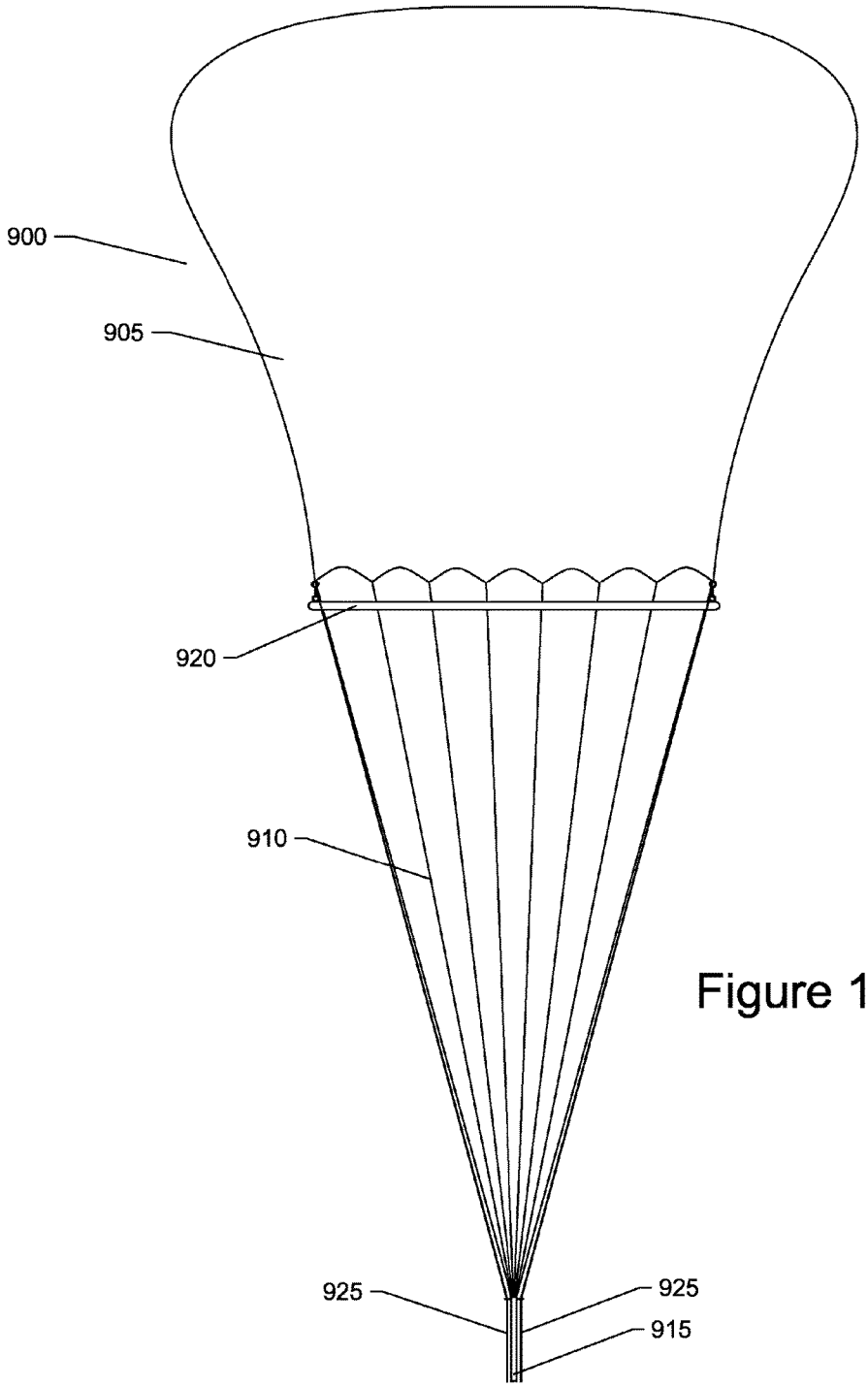
FIG. 17 is a view of a reefed whole-aircraft parachute.

Referring to FIG. 17, a whole-aircraft ballistic parachute 900 that includes a canopy 905, a plurality of suspension lines 910, and a parachute harness 915 is shown. In addition, the ballistic parachute 900 of FIG. 17 includes a plurality of reefing control lines 925. The first end of each reefing control line is coupled to a reefing control mechanism (not shown) in aircraft 200. A simple reefing control mechanism could include a linear actuator, such as a push-pull solenoid, that is coupled to a latch. Depending upon the position of the linear actuator, the latch either restrains or releases the first end of the plurality of reefing control lines 925. Thus, upon receiving a command from processor 405, the reefing control system 550 can either restrain or release the first end of the plurality of reefing control lines 925.

A more complex reefing control mechanism could include a spool that is wound with the plurality of reefing control lines 925. The spool could be coupled to a rotary actuator that, upon receiving a command from processor 405, could extend or even could retract the plurality of reefing control lines 925. Using such reefing control mechanism, the processor 405 could command the reefing control mechanism to either extend or even retract the plurality of reefing control lines 925 a specified distance.

Figure 18:
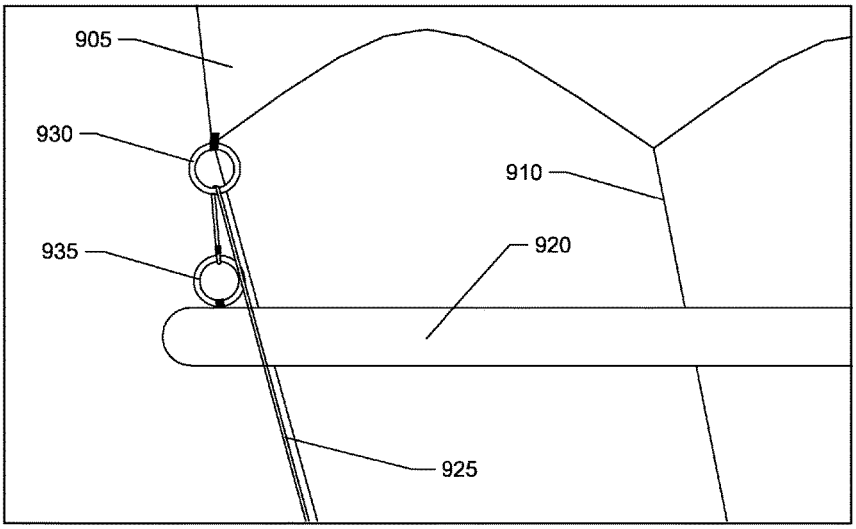
FIG. 18 is a detailed view of the reefed whole-aircraft parachute of FIG. 17.
Figure 19:
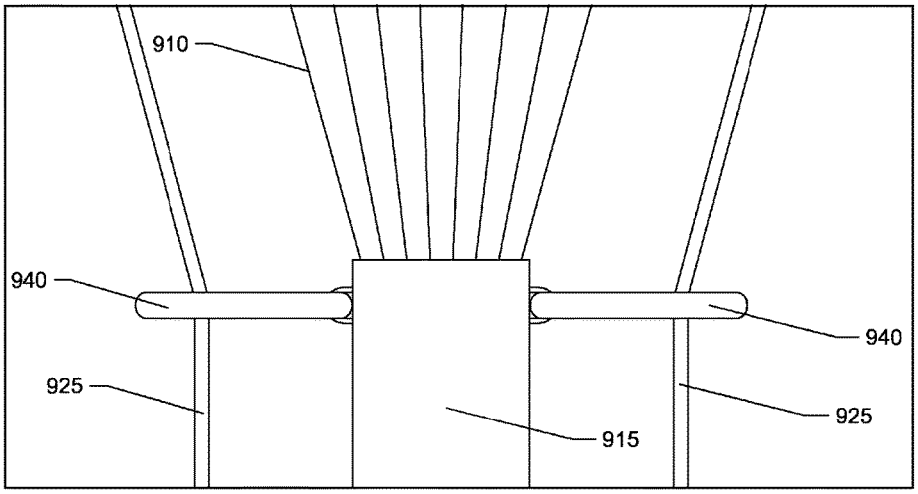
FIG. 19 is another detailed view of the reefed whole-aircraft parachute of FIG. 17.

As shown in FIG. 18 and FIG. 19, the plurality of reefing control lines 925 pass through a plurality of rings 930 and 940. The second end of the plurality of reefing control lines 925 is coupled to reefing device 920 via ring 935. Reefing device 920 could be any of the reefing devices described in U.S. Pat. No. 4,863,119, which is incorporated by reference. Thus, when the plurality of reefing control lines 925 are restrained, the reefing device 920 is kept in close proximity to parachute canopy 905. As a result, the parachute 900 is kept from fully opening. If the reefing control lines 925 are allowed to extend, then the parachute 900 can open more fully. Similarly, if the reefing control lines 925 are released, then the parachute 900 can fully open.

In light of the above, the processor 405 can issue one or more commands to ballistic parachute system 500 that controls the reefing of ballistic parachute 510.

In some ballistic parachute systems, the coupling between the ballistic parachute system 500 and the processor 405 provides the processor 405 with data that indicates that the ballistic parachute 510 has been deployed. This coupling could be via a discrete signal interface. For example, the ballistic parachute system 500 could contain a very thin wire that breaks when the ballistic parachute 510 is deployed. This wire could be coupled to electrical ground by a pull-down resistor. By applying a voltage to that wire and measuring the return voltage, the processor could determine if the ballistic parachute 510 has been deployed.

In other ballistic parachute systems, the coupling also provides the processor 405 with data that indicates that an activation request has been received from the activation interface 530. In such ballistic parachute systems, the coupling could typically also communicate an activation command from the processor 405 that could activate the deployment of the ballistic parachute 510.

Figure 14:
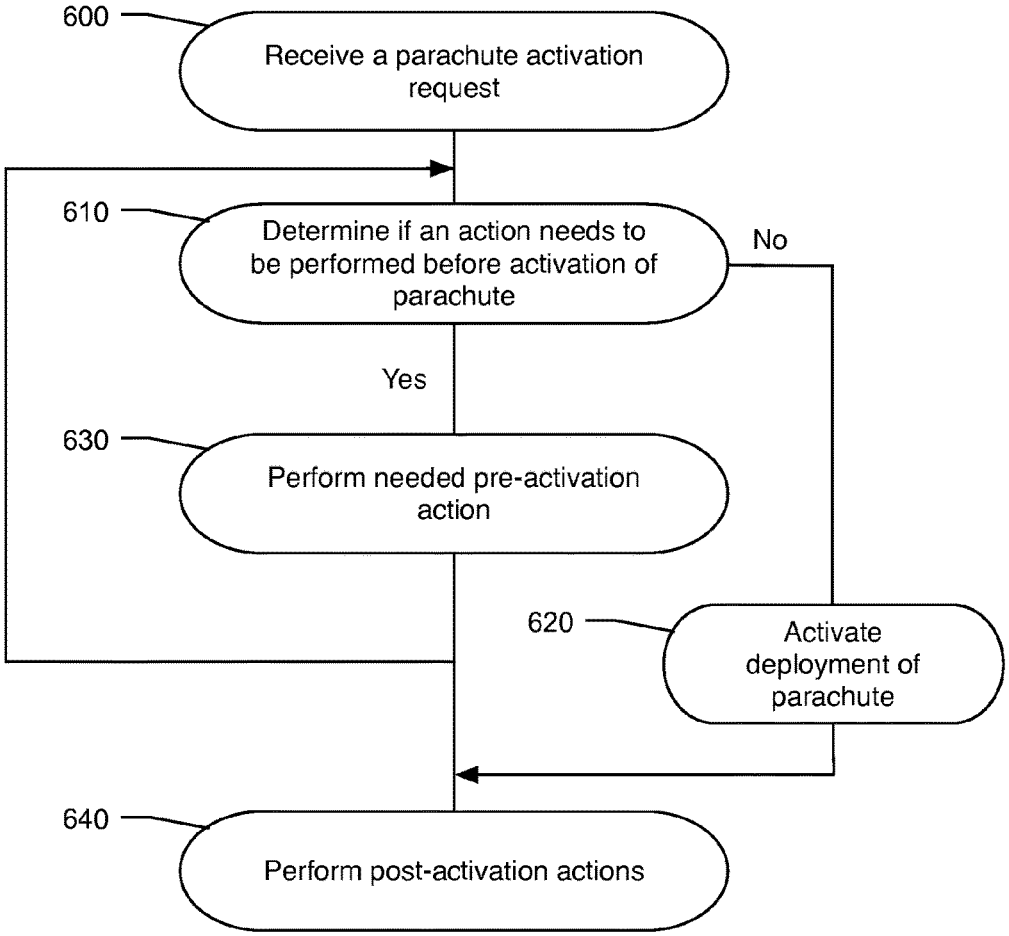
FIG. 14 is a flowchart of a method performed by the system of FIG. 13.

One method of operating the system shown in FIG. 13 is presented in FIG. 14. First, as shown in block 600, the processor 405 could receive a parachute activation request from the ballistic parachute system's activation interface 530. Then, the processor 405 could determine if an action needs to be performed before the activation of the ballistic parachute 510.

One such determination could be to determine if the altitude of the aircraft above the ground needs to be increased for a safe deployment of the ballistic parachute 510. To perform such a determination, the processor 405 could receive longitude and latitude coordinates as well as aircraft altitude from the GPS 465. Then, the processor 405 could query terrain database 470 with the longitude and latitude coordinates to determine the ground elevation at those coordinates. Then, processor 405 could calculate the aircraft's altitude above the ground. If this calculated altitude is less than the minimum safe parachute deployment altitude, then the altitude of the aircraft needs to be increased for a safe deployment of the ballistic parachute 510.

Another determination could be to determine if the airspeed of the aircraft needs to be decreased for a safe deployment of the ballistic parachute 510. To perform such a determination, the processor 405 could receive airspeed data from airspeed sensor 455. Then, the processor 405 could then compare the received airspeed with the maximum safe parachute deployment airspeed. If the received airspeed is greater than the maximum safe parachute deployment airspeed, then the airspeed of the aircraft needs to be decreased for a safe deployment of the ballistic parachute 510.

Another determination could be to determine if the reefing of the parachute needs to be controlled. For example, if the aircraft speed is in excess of a predetermined speed, which may be less than the maximum safe parachute deployment airspeed, and sufficient altitude above the terrain exists, then the reefing of the parachute may need to be controlled.

Another determination could be to determine if the heading of the aircraft will result in an impact into terrain if the ballistic parachute 510 is deployed. To perform such a determination, the processor 405 could receive track data from the GPS 465 and/or could receive heading data from the AHRS 450. Then, using the previously discussed latitude and longitude data together with the previously discussed aircraft altitude data, the processor 405 could query the terrain database 470 to determine if the aircraft will impact terrain during a parachute deployment. If an impact into terrain is determined to be likely, then the heading of the aircraft needs to be changed for a safe deployment of the ballistic parachute 510.

Yet another determination could be to determine if the attitude of the aircraft is proper for a deployment of the ballistic parachute 510. To perform such a determination, the processor 405 could receive attitude data (pitch, roll, heading), and possibly rate of change of attitude, from the AHRS 450. If the received data indicates that the attitude is incorrect, for example, if the aircraft is inverted, then the aircraft attitude needs to be corrected for a safe deployment of the ballistic parachute 510.

Still other determinations could be combinations of the above determinations. For example, it may be allowable to deploy the ballistic parachute 510 when the aircraft is inverted, but only if the aircraft's altitude above ground is equal to or greater than twice the minimum safe parachute deployment altitude. Thus, combinations of the above may be determined by the processor 405.

Referring again to FIG. 14, if the processor 405 at block 610 determines that no action needs to be performed before activation of the ballistic parachute 510, then, as shown in block 620, the processor 405 issues a command to the ballistic parachute system 500 to activate deployment of the ballistic parachute 510.

The above-discussed action-determinations can be pre-calculated by the processor 405 before the activation request is received by the processor 405. Thus, the delay required to check if an action needs to be performed can be less than $1/100^{th}$ of a second. Thus, the ballistic parachute deployment could not be delayed by an amount that could impact the safety of the aircraft occupants.

Referring again to FIG. 14, if the processor 405 at block 610 determines that an above-discussed action, i.e., a pre-activation action, is needed to be performed before activation of the ballistic parachute 510, then as shown in block 630, the processor 405 initiates such pre-activation action.

For example, if the aircraft altitude needs to be increased, then the processor 405 could attempt to increase the aircraft's altitude above the ground. Specifically, if the autopilot 445 is not engaged, then the processor 405 could engage the autopilot 445 and instruct the autopilot 445 to initiate a steep climb to rapidly increase the altitude of the aircraft. If the processor 405 has the ability to control the aircraft engine, then the processor 405 could also instruct the engine to provide full power for a maximum rate climb.

Similarly, if the airspeed of the aircraft exceeds the maximum parachute deployment airspeed, then the processor 405 could instruct the autopilot 445 to initiate a steep climb to rapidly decrease the airspeed of the aircraft. Further, the processor 405 could instruct the autopilot to cross control the aircraft ailerons and rudder to rapidly decrease the aircraft's airspeed. For example, the autopilot may be instructed to apply left rudder and right aileron, or right rudder and left aileron. In addition, the processor 405 may issue a command to lower the aircraft's landing gear 425 in order to decrease the airspeed of the aircraft. Again, if the processor 405 has the ability to control the aircraft engine, then the processor 405 could instruct the engine to reduce engine power.

In addition, if the airspeed of the aircraft exceeds the above-discussed predetermined airspeed, which may be less than the maximum parachute deployment airspeed, then the processor 405 may command the ballistic parachute system 510 to restrain the reefing control lines 925. On the other hand, if the airspeed of the aircraft does not exceed the above-discussed predetermined airspeed, then the processor 405 could command the ballistic parachute system 510 to release or to extend the reefing control lines 925.

Likewise, if the aircraft may impact terrain, such as rising terrain, during parachute deployment unless the aircraft track is modified, then the processor 405 could instruct the autopilot 445 to turn and possibly to climb.

Further, if the aircraft's attitude is found to be improper for a parachute deployment, then the processor 405 could instruct the autopilot to fly a straight and level attitude.

As shown in FIG. 14, the processor 405 could continue to determine if pre-activation actions need to be performed and if such actions are determined to be needed, then the processor 405 could instruct that such pre-activation actions be performed. When no pre-activation actions need to be performed, then, as shown in block 620, the processor 405 could activate deployment of the ballistic parachute 510.

As shown in FIG. 14 in block 640, after activation of the ballistic parachute 510, processor 405 could perform one or more post-activation actions. One such post-activation action could be to lower the aircraft's landing gear 425. Specifically, processor 425 could issue a command, such as setting a discrete voltage level, that lowers the aircraft's landing gear 425. By lowering the aircraft's landing gear 425, the chance of injury to aircraft occupants and the damage to the aircraft could be minimized.

Another post activation action performed by the processor 405 could be to determine if the airspeed of the aircraft is less than the above-discussed predetermined airspeed. If the airspeed of the aircraft is determined to be less than the predetermined airspeed, then the processor 405 could command the ballistic parachute system 500 to release the plurality of reefing control lines 925. Alternatively, the processor 405 could command the ballistic parachute system 500 to extend the plurality of reefing control lines 925 by a first amount when the processor determines that the airspeed of the aircraft is less than a first predetermined airspeed. Then, the processor 405 could command the ballistic parachute system 500 to extend the plurality of reefing control lines 925 by a second amount when the processor determines that the airspeed of the aircraft is less than a second predetermined airspeed. Similarly, the processor 405 could command the ballistic parachute system 500 to extend the plurality of reefing control lines 925 by a third amount when the processor 405 determines that the airspeed of the aircraft is less than a third predetermined airspeed. Then, the processor 405 could command the ballistic parachute system 500 to release reefing control lines 925 when the processor determines that the airspeed of the aircraft is less than a fourth predetermined airspeed.

By controlling the release of or the extended distances of the plurality of reefing control lines 925 based upon the airspeed of the aircraft, the processor 405 can control the opening of the ballistic parachute 510 based upon the airspeed of the aircraft. Thus, if the airspeed of the aircraft is very high, then the ballistic parachute 510 could be opened very slowly. Such a very slow opening could greatly increase the maximum deployment airspeed. On the other hand, if the airspeed of the aircraft was moderate, then the ballistic parachute 510 could be opened faster. Similarly, if the speed of the aircraft was very slow, then the ballistic parachute 510 could be opened at maximum speed. Such a maximum speed opening could significantly reduce the aircraft's altitude loss during parachute deployment. While the airspeed of the aircraft is likely to be the primary factor in determining the opening speed of the parachute, the altitude of the aircraft could also be a factor. For example, if the altitude above the ground was less than the minimum parachute safe deployment altitude, then the parachute could be opened at maximum speed even if the aircraft speed was moderate or high.

Another post activation action performed by the processor 405 could be to set the transponder mode to Mode A, Mode C or Mode S and set the transponder code that is transmitted by the transponder 430 to 7700, the general emergency transponder code. By setting the transponder mode and the transmitter transponder code to 7700 as soon as possible, the opportunity for receipt of the transponder code by air traffic control is enhanced. For example, if the aircraft descends, after parachute deployment, between two mountains, then the receipt of the transponder code transmitted by transponder 430 by air traffic control may be difficult.

Yet another post-activation action performed by the processor 405 could be to activate the emergency locator transmitter 435. Again, by activating the emergency locator transmitter 435 as soon as possible, the opportunity for receipt of the signals transmitted by the emergency locator transmitter 435 is enhanced.

Still another post-activation action performed by the processor 405 could be to set the transmit frequency of the communication radio 440 to 121.5 MHz, the emergency frequency. The processor 405 could also repeatedly transmit a message at a predetermined time interval that includes the aircraft type, the aircraft N number, the aircraft colors, the aircraft latitude and longitude coordinates, the aircraft altitude, the fact that a whole-aircraft parachute has been deployed, the cellular phone number of the pilot, and/or the emergency contact phone number of the pilot. In addition, the message could indicate the possible cause of the emergency, such as an aircraft/aircraft collision, if known. The possible cause of the emergency could be determined by data received from the AHRS 450 and/or the aircraft traffic system 475, as well as from an XM aircraft weather receiver (indicating the presence of thunderstorms), and the aircraft airspeed sensor 455 (indicating over-speeding the aircraft).

Another post-activation action could be to display on the display 420 instructions for the aircraft occupants. For example, the instructions could instruct the aircraft occupants to perform or verify the performance of the above-discussed post-activation actions. The instructions could also display a post-activation checklist. This list could instruct the aircraft occupants to perform additional actions, such as to tighten seat and shoulder belts, to secure any loose items in the aircraft, to partially open aircraft doors, to lower the aircraft flaps, to turn off the aircraft engine, to turn off the fuel to the engine, to retrieve survival gear, such as life-preservers or a survival kit, and finally to turn off the aircraft's electrical system.

The above-discussed post-activation actions could also be performed before activation. For example, the above-discussed post-activation actions could be performed after the processor 405 receives a request to activate the ballistic parachute 510 but before the processor 405 issues a command to activate the ballistic parachute 510. In addition, the above-discussed post-activation actions could be performed 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 seconds before activation. However, it is believed that performance of the above-discussed post-activation actions after the activation of the ballistic parachute 510 is optimal. Thus, such actions will be referred to as post-activation actions.

Figure 15:
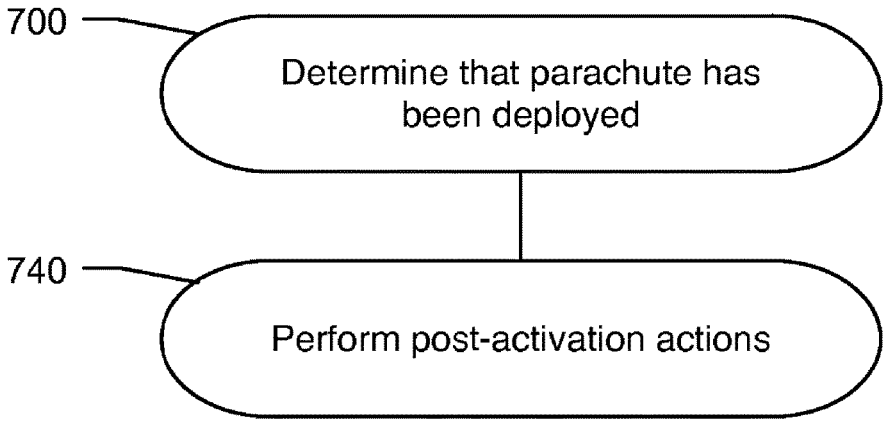
FIG. 15 is a flowchart of another method performed by the system of FIG. 13.

Yet another method that could be performed by the system of FIG. 13 is shown in FIG. 15. As shown in block 700, the processor 405 could determine that the ballistic parachute 510 has been deployed. As discussed above, this determination could be made by determining that a thin wire has been broken during the deployment of the ballistic parachute 510. After making the determination, then the processor 405, as shown in block 740, could perform one or more of the above-discussed post-activation actions. In some embodiments of the method of FIG. 15, the processor 405 may command display 420 to display a message seeking confirmation of the ballistic parachute deployment. In such embodiments, the processor 405 would not perform any post-activations actions (except for displaying the above message), until receiving confirmation of the ballistic parachute deployment from an occupant of the aircraft. Such confirmation could be indicated by an aircraft occupant depressing a button on the dash of the aircraft.

Figure 16:
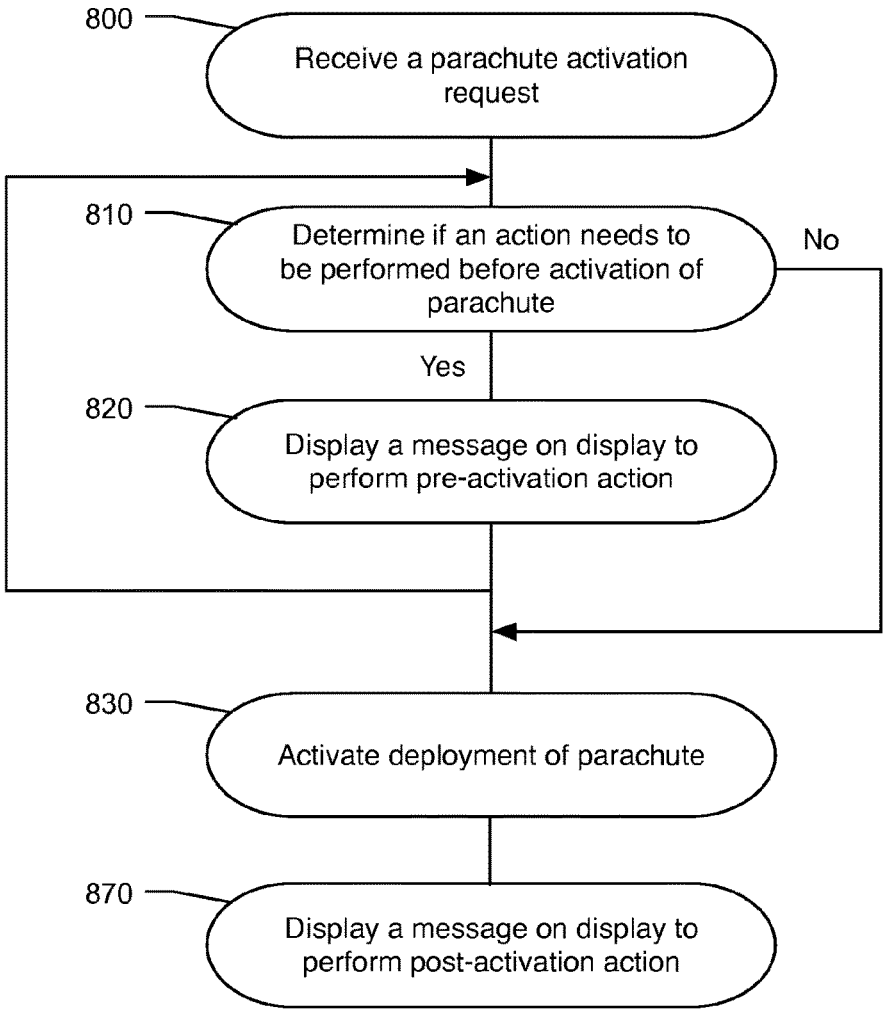
FIG. 16 is a flowchart of yet another method performed by the system of FIG. 13.

Still another method that could be performed by the system of FIG. 13 is shown in FIG. 16. As shown in block 800, the processor 405 receives a parachute activation request. Then, as shown in block 810, the processor 405 determines if a pre-activation action, such as the pre-activation actions discussed with respect to FIG. 14, needs to be performed. If no such action needs to be performed, then as shown in block 830, the processor could activate deployment of the ballistic parachute 510. If such an action does need to be performed, then, as shown in block 820, the processor 405 commands the display 420 to display a message instructing an aircraft occupant to perform one or more pre-activation actions. For example, the processor 405 may instruct the occupant to initiate a rapid climb to increase the altitude and/or decrease the airspeed of the aircraft. After a predetermined period of time, the processor could again determine if a pre-activation action needs to be performed. When no pre-activation actions need to be performed, if the processor 405 has determined that the needed actions are not being performed (because the aircraft is not climbing, slowing down, etc.) by an aircraft occupant, if a predetermined time period has expired, or if ground impact is determined to be likely, then the processor 405 could activate deployment of the ballistic parachute 510 as shown in block 830.

After activation of the deployment of ballistic parachute 510, then the processor 405 could command the display 420 to display instructions. For example, as discussed above, the displayed instructions could be to perform or verify performance of the above-discussed post-activation actions. The instructions could also display a post parachute activation checklist. This list could instruct the aircraft occupants to perform additional actions, such as to tighten seat and shoulder belts, to secure any loose items in the aircraft, to partially open aircraft doors, to lower the aircraft flaps, to turn off the aircraft engine, to turn off the fuel to the engine, to retrieve survival gear, such as life-preservers or a survival kit, and finally to turn off the aircraft's electrical system.

Some of above described systems couple a panel, such as the panel 238, to a whole-aircraft parachute strap so that when the parachute strap is tensioned, the panel 238 moves with respect to a lower wing skin, such as the lower wing skin 237. As a result of such movement, a fuel discharge passageway is created that allows aircraft fuel to rapidly discharge from an aircraft fuel tank. Other embodiments of the invention do not couple such a panel to a parachute strap. Some of these embodiments couple such a panel to an actuator, such as a screw drive linear actuator. The actuator is electrically coupled to a processor, such as the processor 405. In such embodiments, the processor can issue a command to the actuator that will cause the actuator to move. Such actuator movement will cause the panel to move with respect to the lower wing skin. Such panel movement will create a fuel discharge passageway that allows aircraft fuel to rapidly discharge from the aircraft fuel tank to which the panel forms a part. The actuator can be mounted internal to or external to the fuel tank. If the actuator is mounted external to the fuel tank, then the actuator could be coupled to the panel via one or more cables, straps, tubes, bell-cranks, etc. and a pass-through. In such embodiments, the discharging of aircraft fuel (or anti-icing fluid) would be a post-activation action, as that phrase is utilized above.

Portions of the above-described methods could be performed by a processor, such as processor 405, that is executing a computer program. This computer program can be stored in program storage device 415 and/or memory 410. The computer program would contain machine-readable instructions, that when read and executed by the processor, would perform the portions of the above-described methods.

In addition, distributed processing systems could perform the above methods. Thus, one processor may perform portions of the above methods and one or more other processors could perform other portions of the above methods. For example, the processor 405 shown in FIG. 13 could perform a portion of the above methods while another processor that is included in the whole-aircraft ballistic parachute 500 could perform other portions of the above methods.

The above description includes words such as "first", "then", and "next". These words indicate a sequence of acts.

Many of the sequences can be modified within the scope of the invention. Thus, unless the result of a first act is required for a second act, the language in the above description indicating a sequence should not be considered to be limitations of the invention.

Many of the above-discussed systems and methods can be combined to produce an increased-safety aircraft. Such combinations are intended to be within the scope of the invention.

The invention claimed is:

[1. A method performed by an aircraft, the aircraft including a whole-aircraft ballistic parachute that is coupled to the aircraft, the method comprising:

receiving, from an aircraft occupant, a whole-aircraft ballistic parachute deployment request; then based upon the receipt of the ballistic parachute deployment request, both performing an action and also deploying the whole-aircraft ballistic parachute.]

2. [The method of claim 1] *A method performed by an aircraft, the aircraft including a whole-aircraft ballistic parachute that is coupled to the aircraft, the method comprising:*

*receiving, from an aircraft occupant, a whole-aircraft ballistic parachute deployment request; then*

*based upon the receipt of the ballistic parachute deployment request, both performing an action and also deploying the whole-aircraft ballistic parachute*, wherein the action includes increasing the altitude of the aircraft above the ground.

3. [The method of claim 1] *A method performed by an aircraft, the aircraft including a whole-aircraft ballistic parachute that is coupled to the aircraft, the method comprising:*

*receiving, from an aircraft occupant, a whole-aircraft ballistic parachute deployment request; then*

*based upon the receipt of the ballistic parachute deployment request, both performing an action and also deploying the whole-aircraft ballistic parachute*, wherein the action includes decreasing the airspeed of the aircraft *and includes increasing the altitude of the aircraft above the ground*.

4. The method of claim [1] *2*, wherein the action includes controlling [the] *a* reefing of the whole-aircraft ballistic parachute.

5. The method of claim 4, wherein the controlling the reefing includes restraining a reefing control line.

6. The method of claim 4, wherein the controlling the reefing includes restraining a reefing control line that is coupled to a reefing device.

7. The method of claim [1] *2*, wherein the action includes changing the heading of the aircraft.

8. The method of claim [1] *2*, wherein the action includes changing the attitude of the aircraft.

9. The method of claim [1] *2*, wherein the action includes displaying a visual indication on a display [that is coupled to the processor].

10. The method of claim [1] *2*, further comprising, after deploying the whole-aircraft ballistic parachute, performing a second action.

11. The method of claim 10, wherein the second action includes controlling [the] *a* reefing of the whole-aircraft ballistic parachute.

12. The method of claim 11, wherein the controlling the reefing of the whole-aircraft ballistic parachute includes releasing a reefing control line that is coupled to a reefing device.

13. [The method of claim 11] *A method performed by an aircraft, the aircraft including a whole-aircraft ballistic parachute that is coupled to the aircraft, the method comprising:*

*receiving, from an aircraft occupant, a whole-aircraft ballistic parachute deployment request; then*

*based upon the receipt of the ballistic parachute deployment request, both performing an action and also deploying the whole-aircraft ballistic parachute,*

*the method further comprising, after deploying the whole-aircraft ballistic parachute, performing a second action,*

*wherein the whole-aircraft ballistic parachute can be controlled, and wherein the second action includes controlling a reefing of the whole-aircraft ballistic parachute*, wherein the controlling the reefing of the whole-aircraft ballistic parachute includes extending a reefing control line, which is coupled to a reefing device, and then releasing the reefing control line.

14. The method of claim 10, wherein the aircraft includes a transponder and wherein the *second* action includes commanding the transponder to enter one of Mode A, Mode C, or Mode S.

15. The method of claim 10, wherein the second action includes activating an emergency locator transmitter.

16. The method of claim 10, wherein the second action includes setting a transmitter frequency of a communication radio to 121.5 MHz.

17. The method of claim 10, wherein the second action includes setting a transmitter frequency of a communication radio to 121.5 MHz and then transmitting a message on the transmitter frequency containing the aircraft type, the aircraft N number, the aircraft colors, the aircraft latitude and longitude coordinates, the fact that a whole-aircraft ballistic parachute has been deployed, and at least one phone number.

18. The method of claim 10, wherein the second action includes displaying a visual indication on a display [that is coupled to the processor].

19. The method of claim 10, *wherein the aircraft includes landing gear and* wherein the second action includes lowering the landing gear of the aircraft.

[20. An aircraft, the aircraft including a whole-aircraft ballistic parachute that is coupled to the aircraft, the aircraft configured to perform a method comprising:

receiving a whole-aircraft ballistic parachute deployment request from an occupant of the aircraft; then based upon the receipt of the whole-aircraft ballistic parachute deployment request, both performing an action and also deploying the whole-aircraft ballistic parachute.]

*21. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a pitch sensor,*

*a roll sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the pitch sensor, at least one of the one or more processors is coupled to the roll sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether the airspeed of the aircraft exceeds a reference airspeed;*

*(b) if the determination in action (a) determines that the airspeed of the aircraft does not exceed the reference airspeed, then, based at least upon the determination in action (a), commanding deployment of the whole-aircraft ballistic parachute;*

*(c) if the determination in action (a) determines that the airspeed of the aircraft does exceed the reference airspeed, then, based at least upon the determination in action (a):*

*(i) commanding a reduction in engine power;*

*(ii) commanding a change in aircraft pitch; and*

*(iii) commanding a change in aircraft roll;*

*(d) after commanding the reduction in engine power, then determining if the airspeed of the aircraft exceeds the reference airspeed;*

*(e) if the determination in action (d) determines that the airspeed of the aircraft does not exceed the reference airspeed, then, based at least upon the determination in action (d), commanding deployment of the whole-aircraft ballistic parachute.*

*22. The aircraft of claim 21, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute.*

*23. The aircraft of claim 22, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*24. The aircraft of claim 21, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the aircraft exceeds a reference airspeed.*

*25. The aircraft of claim 24, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*26. The aircraft of claim 21, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*27. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether the airspeed of the aircraft exceeds a reference airspeed;*

*(b) if the determination in action (a) determines that the airspeed of the aircraft does not exceed the reference airspeed, then, based at least upon the determination in action (a), commanding deployment of the whole-aircraft ballistic parachute;*

*(c) if the determination in action (a) determines that the airspeed of the aircraft does exceed the reference airspeed, then, based at least upon the determination in action (a):*

*(i) commanding a reduction in engine power;*

*(d) after commanding the reduction in engine power, then determining if the airspeed of the aircraft exceeds the reference airspeed;*

*(e) if the determination in action (d) determines that the airspeed of the aircraft does not exceed the reference airspeed, then, based at least upon the determination in*

*action (d), commanding deployment of the whole-aircraft ballistic parachute.*

*28. The aircraft of claim 27, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute.*

*29. The aircraft of claim 28, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*30. The aircraft of claim 27, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the aircraft exceeds a reference airspeed.*

*31. The aircraft of claim 30, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*32. The aircraft of claim 27, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*33. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a pitch sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the pitch sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether the airspeed of the aircraft exceeds a reference airspeed;*

*(b) if the determination in action (a) determines that the airspeed of the aircraft does not exceed the reference airspeed, then, based at least upon the determination in action (a), commanding deployment of the whole-aircraft ballistic parachute;*

*(c) if the determination in action (a) determines that the airspeed of the aircraft does exceed the reference airspeed, then, based at least upon the determination in action (a):*

*(i) commanding a change in aircraft pitch;*

*(d) after commanding the change in aircraft pitch, then determining if the airspeed of the aircraft exceeds the reference airspeed;*

*(e) if the determination in action (d) determines that the airspeed of the aircraft does not exceed the reference airspeed, then, based at least upon the determination in action (d), commanding deployment of the whole-aircraft ballistic parachute.*

*34. The aircraft of claim 33, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute.*

*35. The aircraft of claim 34, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*36. The aircraft of claim 33, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the aircraft exceeds a reference airspeed.*

*37. The aircraft of claim 36, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*38. The aircraft of claim 33, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*39. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether the airspeed of the aircraft exceeds a reference airspeed;*

*(b) if the determination in action (a) determines that the airspeed of the aircraft does not exceed the reference airspeed, then, based at least upon the determination in action (a), commanding deployment of the whole-aircraft ballistic parachute;*

*(c) if the determination in action (a) determines that the airspeed of the aircraft does exceed the reference airspeed, then, based at least upon the determination in action (a):*

*(i) commanding a change in aircraft roll;*

*(d) after commanding the change in aircraft roll, then determining if the airspeed of the aircraft exceeds the reference airspeed;*

*(e) if the determination in action (d) determines that the airspeed of the aircraft does not exceed the reference airspeed, then, based at least upon the determination in action (d), commanding deployment of the whole-aircraft ballistic parachute.*

*40. The aircraft of claim 39, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute.*

*41. The aircraft of claim 40, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*42. The aircraft of claim 39, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the aircraft exceeds a reference airspeed.*

*43. The aircraft of claim 42, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*44. The aircraft of claim 39, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*45. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether the airspeed of the aircraft exceeds a reference airspeed;*

*(b) if the determination in action (a) determines that the airspeed of the aircraft does not exceed the reference airspeed, then, based at least upon the determination in action (a), commanding deployment of the whole-aircraft ballistic parachute;*

(c) *if the determination in action (a) determines that the airspeed of the aircraft does exceed the reference airspeed, then, based at least upon the determination in action (a):*

(i) *commanding the autopilot to decelerate the aircraft;*

(d) *after commanding the autopilot to decelerate the aircraft, then determining if the airspeed of the aircraft exceeds the reference airspeed;*

(e) *if the determination in action (d) determines that the airspeed of the aircraft does not exceed the reference airspeed, then, based at least upon the determination in action (d), commanding deployment of the whole-aircraft ballistic parachute.*

*46. The aircraft of claim 45, wherein the machine readable-instructions include the actions comprising:*

(f) *determining whether a period of time has elapsed;*

*if the determination in action (f) determines that the period of time has elapsed, then, based at least upon the determination that the period of time has elapsed, commanding deployment of the whole-aircraft ballistic parachute.*

*47. The aircraft of claim 46, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*48. The aircraft of claim 45, wherein the machine readable-instructions include the actions comprising:*

(f) *determining whether a period of time has elapsed;*

*if the determination in action (f) determines that the period of time has elapsed, then, based at least upon the determination that the period of time has elapsed, commanding deployment of the whole-aircraft ballistic parachute even if the aircraft exceeds a reference airspeed.*

*49. The aircraft of claim 48, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*50. The aircraft of claim 45, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*51. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*an autopilot;*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(a) *determining whether the airspeed of the aircraft exceeds a reference airspeed;*

(b) *if the determination in action (a) determines that the airspeed of the aircraft does not exceed the reference airspeed, then, based at least upon the determination in action (a), commanding deployment of the whole-aircraft ballistic parachute.*

*52. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a pitch sensor,*

*a roll sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the pitch sensor, at least one of the one or more processors is coupled to the roll sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(a) *determining whether the airspeed of the aircraft exceeds a reference airspeed;*

(b) *if the determination in action (a) determines that the airspeed of the aircraft does not exceed the reference airspeed, then, based at least upon the determination in action (a), commanding deployment of the whole-aircraft ballistic parachute;*

(c) *if the determination in action (a) determines that the airspeed of the aircraft does exceed the reference airspeed, then, based at least upon the determination in action (a):*

(i) *commanding a reduction in engine power;*

(ii) *commanding a change in aircraft pitch; and*

(iii) *commanding a change in aircraft roll.*

*53. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(a) *determining whether the airspeed of the aircraft exceeds a reference airspeed;*

(b) *if the determination in action (a) determines that the airspeed of the aircraft does not exceed the reference airspeed, then, based at least upon the determination in action (a), commanding deployment of the whole-aircraft ballistic parachute;*

(c) *if the determination in action (a) determines that the airspeed of the aircraft does exceed the reference airspeed, then, based at least upon the determination in action (a):*

(i) *commanding a reduction in engine power.*

*54. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a pitch sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the pitch sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(a) *determining whether the airspeed of the aircraft exceeds a reference airspeed;*

(b) *if the determination in action (a) determines that the airspeed of the aircraft does not exceed the reference airspeed, then, based at least upon the determination in action (a), commanding deployment of the whole-aircraft ballistic parachute;*

(c) *if the determination in action (a) determines that the airspeed of the aircraft does exceeds the reference airspeed, then, based at least upon the determination in action (a):*

(i) *commanding a change in aircraft pitch.*

*55. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(a) *determining whether the airspeed of the aircraft exceeds a reference airspeed;*

(b) *if the determination in action (a) determines that the airspeed of the aircraft does not exceed the reference airspeed, then, based at least upon the determination in action (a), commanding deployment of the whole-aircraft ballistic parachute;*

(c) *if the determination in action (a) determines that the airspeed of the aircraft does exceed the reference airspeed, then, based at least upon the determination in action (a):*

(i) *commanding a decrease in aircraft roll.*

*56. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a pitch sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the pitch sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(a) *determining whether the airspeed of the aircraft exceeds a reference airspeed;*

(b) *if the determination in action (a) determines that the airspeed of the aircraft does not exceed the reference airspeed, then, based at least upon the determination in action (a), commanding deployment of the whole-aircraft ballistic parachute;*

(c) *if the determination in action (a) determines that the airspeed of the aircraft does exceed the reference airspeed, then, based at least upon the determination in action (a):*

(i) *commanding the autopilot to decelerate the aircraft.*

*57. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a pitch sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the pitch sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(a) *determining whether the airspeed of the aircraft exceeds a reference airspeed;*

(b) *if the determination in action (a) determines that the airspeed of the aircraft does not exceed the reference airspeed, then, based at least upon the determination in action (a), commanding deployment of the whole-aircraft ballistic parachute;*

(c) *if the determination in action (a) determines that the airspeed of the aircraft does exceed the reference airspeed, then, based at least upon the determination in action (a):*

(i) *commanding the autopilot to change the pitch and the roll of the aircraft.*

*58. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*an altitude sensor,*

*a roll sensor*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the altitude sensor, at least one of the one or more processors is coupled to the roll sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(*a*) *determining whether one or more parameters need to be changed for deployment of the whole-aircraft ballistic parachute;*

(*b*) *if the determination in action* (*a*) *determines that the one or more parameters do not need to be changed for deployment of the whole-aircraft ballistic parachute, then, based at least upon the determination in action* (*a*), *commanding deployment of the whole-aircraft ballistic parachute;*

(*c*) *if the determination in action* (*a*) *determines that the one or more parameters do need to be changed for deployment of the whole-aircraft ballistic parachute, then, based at least upon the determination in action* (*a*):

(*i*) *commanding a reduction in engine power;*

(*ii*) *commanding a climb; and*

(*iii*) *commanding a decrease in aircraft roll;*

(*d*) *after commanding a reduction in engine power, then determining if the one or more parameters need to be changed for deployment of the whole-aircraft ballistic parachute;*

(*e*) *if the determination in action* (*d*) *determines that the one or more parameters do not need to be changed for deployment of the whole-aircraft ballistic parachute, then, based at least upon the determination in action* (*d*), *commanding deployment of the whole-aircraft ballistic parachute.*

*59. The aircraft of claim 58, wherein the machine readable-instructions include the actions comprising:*

(*f*) *determining whether a period of time has elapsed;*

*if the determination in action* (*f*) *determines that the period of time has elapsed, then, based at least upon the determination that the period of time has elapsed, commanding deployment of the whole-aircraft ballistic parachute even if the one or more parameters need to be changed for deployment of the whole-aircraft ballistic parachute.*

*60. The aircraft of claim 59, wherein the machine readable-instructions include the actions comprising:*

*based at least upon the receipt of the whole-aircraft ballistic parachute deployment request:*

(*i*) *commanding an emergency locator transmitter to transmit a signal and*

(*ii*) *displaying a message on a display in the aircraft.*

*61. The aircraft of claim 58, wherein the machine readable-instructions include the actions comprising:*

*based at least upon the receipt of the whole-aircraft ballistic parachute deployment request:*

(*i*) *commanding an emergency locator transmitter to transmit a signal and*

(*ii*) *displaying a message on a display in the aircraft.*

*62. An aircraft, the aircraft including:*

*a fuselage,*

*a whole-aircraft ballistic parachute, which includes a rocket, that is coupled to the fuselage of the aircraft,*

*an activation interface,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*determining whether a period of time has elapsed;*

*based at least upon a determination that the period of time has elapsed, commanding deployment of the whole-aircraft ballistic parachute.*

*63. The aircraft of claim 62, wherein the machine readable-instructions include the actions comprising:*

*based at least upon the receipt of the whole-aircraft ballistic parachute deployment request:*

(*i*) *commanding an emergency locator transmitter to transmit a signal and*

(*ii*) *displaying a message on a display in the aircraft.*

*64. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(*a*) *determining whether one or more parameters need to be changed for deployment of the whole-aircraft ballistic parachute;*

(*b*) *if the determination in action* (*a*) *determines that the one or more parameters does not need to be changed for deployment of the whole-aircraft ballistic parachute, then, based at least upon the determination in action* (*a*), *commanding deployment of the whole-aircraft ballistic parachute;*

(*c*) *if the determination in action* (*a*) *determines that the one or more parameters does need to be changed for*

*deployment of the whole-aircraft ballistic parachute, then, based at least upon the determination in action (a):*

*(i) commanding a reduction in engine power;*

*(d) after commanding a reduction in engine power, then determining if the one or more parameters need to be changed for deployment of the whole-aircraft ballistic parachute;*

*(e) if the determination in action (d) determines that the one or more parameters does not need to be changed for deployment of the whole-aircraft ballistic parachute, then, based at least upon the determination in action (d), commanding deployment of the whole-aircraft ballistic parachute.*

*65. The aircraft of claim 64, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute.*

*66. The aircraft of claim 65, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*67. The aircraft of claim 64, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the one or more parameters need to be changed for deployment of the whole-aircraft ballistic parachute.*

*68. The aircraft of claim 67, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*69. The aircraft of claim 64, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*70. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*an altitude sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the altitude sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding a climb;*

*(d) after commanding the climb, then determining if the one or more parameters need to be changed for deployment of the whole-aircraft ballistic parachute;*

*(e) if the determination in action (d) determines that the one or more parameters does not need to be changed for deployment of the whole-aircraft ballistic parachute, then, based at least upon the determination in action (d), commanding deployment of the whole-aircraft ballistic parachute.*

*71. The aircraft of claim 70, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute.*

*72. The aircraft of claim 71, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*73. The aircraft of claim 70, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic*

*parachute even if the one or more parameters need to be changed for deployment of the whole-aircraft ballistic parachute.*

*74. The aircraft of claim 73, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*75. The aircraft of claim 70, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*76. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding a decrease in aircraft roll;*

*(d) after commanding the decrease in aircraft roll, then determining if the one or more parameters need to be changed for deployment of the whole-aircraft ballistic parachute;*

*(e) if the determination in action (d) determines that the one or more parameters does not need to be changed for deployment of the whole-aircraft ballistic parachute, then, based at least upon the determination in action (d), commanding deployment of the whole-aircraft ballistic parachute.*

*77. The aircraft of claim 76, wherein the machine readable-instructions include the actions comprising:*

*f) determining whether a period of time has elapsed;*

*if the determination in action (f) determines that the period of time has elapsed, then, based at least upon the determination that the period of time has elapsed, commanding deployment of the whole-aircraft ballistic parachute.*

*78. The aircraft of claim 77, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*79. The aircraft of claim 76, wherein the machine readable-instructions include the actions comprising:*

*f) determining whether a period of time has elapsed;*

*if the determination in action (f) determines that the period of time has elapsed, then, based at least upon the determination that the period of time has elapsed, commanding deployment of the whole-aircraft ballistic parachute even if the one or more parameters need to be changed for deployment of the whole-aircraft ballistic parachute.*

*80. The aircraft of claim 79, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*81. The aircraft of claim 76, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*82. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*a pitch sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is*

*coupled to the pitch sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding the autopilot to decelerate the aircraft;*

*(d) after commanding the autopilot to decelerate the aircraft, then determining if the one or more parameters need to be changed for deployment of the whole-aircraft ballistic parachute;*

*(e) if the determination in action (d) determines that the one or more parameters does not need to be changed for deployment of the whole-aircraft ballistic parachute, then, based at least upon the determination in action (d), commanding deployment of the whole-aircraft ballistic parachute.*

*83. The aircraft of claim 82, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute.*

*84. The aircraft of claim 83, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*85. The aircraft of claim 82, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the one or more parameters need to be changed for deployment of the whole-aircraft ballistic parachute.*

*86. The aircraft of claim 85, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*87. The aircraft of claim 82, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*88. An aircraft, the aircraft including:*

*a fuselage,*

*a whole-aircraft ballistic parachute, which includes a rocket, that is coupled to the fuselage of the aircraft,*

*an activation interface,*

*a sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute.*

*89. An aircraft, the aircraft including:*

*a fuselage,*

*a whole-aircraft ballistic parachute, which includes a rocket, that is coupled to the fuselage of the aircraft,*

*an activation interface,*

*a sensor,*

*an altitude sensor,*

*a roll sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the altitude sensor, at least one of the one or more processors is coupled to the roll sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding a reduction in engine power;*

*(ii) commanding a climb; and*

*(iii) commanding a decrease in aircraft roll.*

*90. An aircraft, the aircraft including:*

*a fuselage,*

*a sensor,*

*a whole-aircraft ballistic parachute, which includes a rocket, that is coupled to the fuselage of the aircraft,*

*an activation interface,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding a reduction in engine power.*

*91. An aircraft, the aircraft including:*

*a fuselage,*

*a whole-aircraft ballistic parachute, which includes a rocket, that is coupled to the fuselage of the aircraft,*

*an activation interface,*

*a sensor,*

*an altitude sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the altitude sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding a climb.*

*92. An aircraft, the aircraft including:*

*a fuselage,*

*a whole-aircraft ballistic parachute, which includes a rocket, that is coupled to the fuselage of the aircraft,*

*an activation interface,*

*a sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding a decrease in aircraft roll.*

*93. An aircraft, the aircraft including:*

*a fuselage,*

*a whole-aircraft ballistic parachute, which includes a rocket, that is coupled to the fuselage of the aircraft,*

*an activation interface,*

*a pitch sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the pitch sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding the autopilot to decelerate the aircraft.*

*94. An aircraft, the aircraft including:*

*a fuselage,*

*a whole-aircraft ballistic parachute, which includes a rocket, that is coupled to the fuselage of the aircraft,*

*an activation interface,*

*a pitch sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the pitch sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) determining whether one or more parameters need to be changed for deployment of the whole-aircraft ballistic parachute;*

*(b) if the determination in action (a) determines that the one or more parameters does not need to be changed for deployment of the whole-aircraft ballistic parachute, then, based at least upon the determination in*

*action (a), commanding deployment of the whole-aircraft ballistic parachute;*

*(c) if the determination in action (a) determines that the one or more parameters does need to be changed for deployment of the whole-aircraft ballistic parachute, then, based at least upon the determination in action (a):*

*(i) commanding the autopilot to change the pitch and the roll of the aircraft.*

*95. An aircraft, the aircraft including:*

*a fuselage,*

*a whole-aircraft ballistic parachute, which includes a rocket, that is coupled to the fuselage of the aircraft,*

*an activation interface,*

*an airspeed sensor,*

*an altitude sensor,*

*a roll sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the airspeed sensor, at least one of the one or more processors is coupled to the altitude sensor, at least one of the one or more processors is coupled to the roll sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) performing a first evaluation that produces a first output;*

*(b) based at least upon the first output being in a first state, then commanding deployment of the whole-aircraft ballistic parachute;*

*(c) based at least upon the first output being in a second state, then:*

*(i) commanding a reduction in engine power;*

*(ii) commanding a climb; and*

*(iii) commanding a decrease in aircraft roll;*

*(d) after commanding the reduction in engine power, then performing a second evaluation that produces a second output;*

*(e) based at least upon the second output being in a first state, then, commanding deployment of the whole-aircraft ballistic parachute.*

*96. The aircraft of claim 95, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute.*

*97. The aircraft of claim 96, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*98. The aircraft of claim 95, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the second output is not in the first state.*

*99. The aircraft of claim 98, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*100. The aircraft of claim 95, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*101. An aircraft, the aircraft including:*

*a fuselage,*

*a whole-aircraft ballistic parachute, which includes a rocket, that is coupled to the fuselage of the aircraft,*

*an activation interface,*

*a sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) performing an first evaluation that produces a first output;*

(b) *if the first output is in a first state, then commanding deployment of the whole-aircraft ballistic parachute;*

(c) *if the first output is in a second state, then*

(i) *commanding a reduction in engine power;*

(d) *after commanding the reduction in engine power, then performing a second evaluation that produces a second output;*

(e) *if the second output is in a first state, then, commanding deployment of the whole-aircraft ballistic parachute.*

*102. The aircraft of claim 101, wherein the machine readable-instructions include the actions comprising:*

(f) *determining whether a period of time has elapsed;*

*if the determination in action (f) determines that the period of time has elapsed, then, based at least upon the determination that the period of time has elapsed, commanding deployment of the whole-aircraft ballistic parachute.*

*103. The aircraft of claim 102, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*104. The aircraft of claim 101, wherein the machine readable-instructions include the actions comprising:*

(f) *determining whether a period of time has elapsed;*

*if the determination in action (f) determines that the period of time has elapsed, then, based at least upon the determination that the period of time has elapsed, commanding deployment of the whole-aircraft ballistic parachute even if the second output is not in the first state.*

*105. The aircraft of claim 104, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*106. The aircraft of claim 101, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*107. An aircraft, the aircraft including:*

*a fuselage,*

*a whole-aircraft ballistic parachute, which includes a rocket, that is coupled to the fuselage of the aircraft,*

*an activation interface,*

*an altitude sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the altitude sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(a) *performing a first evaluation that produces a first output;*

(b) *based at least upon the first output being in a first state, then commanding deployment of the whole-aircraft ballistic parachute;*

(c) *based at least upon the first output being in a second state, then:*

(i) *commanding a climb;*

(d) *after commanding the climb, then performing a second evaluation that produces a second output;*

(e) *based at least upon the second output being in a first state, then, commanding deployment of the whole-aircraft ballistic parachute.*

*108. The aircraft of claim 107, wherein the machine readable-instructions include the actions comprising:*

(f) *determining whether a period of time has elapsed;*

*if the determination in action (f) determines that the period of time has elapsed, then, based at least upon the determination that the period of time has elapsed, commanding deployment of the whole-aircraft ballistic parachute.*

*109. The aircraft of claim 108, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*110. The aircraft of claim 107, wherein the machine readable-instructions include the actions comprising:*

(f) *determining whether a period of time has elapsed;*

*if the determination in action (f) determines that the period of time has elapsed, then, based at least upon the determination that the period of time has elapsed, commanding deployment of the whole-aircraft ballistic parachute even if the second output is not in the first state.*

*111. The aircraft of claim 110, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*112. The aircraft of claim 107, wherein the machine readable-instructions include the actions comprising:*

*based at least upon the receipt of the whole-aircraft ballistic parachute deployment request:*

(i) *commanding an emergency locator transmitter to transmit a signal and*

(ii) *displaying a message on a display in the aircraft.*

*113. An aircraft, the aircraft including:*

*a fuselage,*

*a whole-aircraft ballistic parachute, which includes a rocket, that is coupled to the fuselage of the aircraft,*

*an activation interface,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) performing a first evaluation that produces a first output;*

*(b) based at least upon the first output being in a first state, then commanding deployment of the whole-aircraft ballistic parachute;*

*(c) based at least upon the first output being in a second state, then:*

*(i) commanding a decrease in aircraft roll;*

*(d) after commanding the decrease in aircraft roll, then performing a second evaluation that produces a second output;*

*(e) based at least upon the second output being in a first state, then, commanding deployment of the whole-aircraft ballistic parachute.*

*114. The aircraft of claim 113, wherein the machine readable-instructions include the actions comprising:*

*(f) determining whether a period of time has elapsed; if the determination in action (f) determines that the period of time has elapsed, then, based at least upon the determination that the period of time has elapsed, commanding deployment of the whole-aircraft ballistic parachute.*

*115. The aircraft of claim 114, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*116. The aircraft of claim 113, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the second output is not in the first state.*

*117. The aircraft of claim 116, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*118. The aircraft of claim 113, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*119. An aircraft, the aircraft including:*

*a fuselage,*

*a whole-aircraft ballistic parachute, which includes a rocket, that is coupled to the fuselage of the aircraft,*

*an activation interface,*

*a pitch sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the pitch sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) performing a first evaluation that produces a first output;*

*(b) based at least upon the first output being in a first state, then commanding deployment of the whole-aircraft ballistic parachute;*

*(c) based at least upon the first output being in a second state, then:*

*(i) commanding the autopilot to decelerate the aircraft;*

*(d) after commanding the autopilot to decelerate the aircraft, then performing a second evaluation that produces a second output;*

*(e) based at least upon the second output being in a first state, then, commanding deployment of the whole-aircraft ballistic parachute.*

*120. The aircraft of claim 119, wherein the machine readable-instructions include the actions comprising:*

*(f) determining whether a period of time has elapsed;*

*if the determination in action (f) determines that the period of time has elapsed, then, based at least upon the*

*determination that the period of time has elapsed, commanding deployment of the whole-aircraft ballistic parachute.*

*121. The aircraft of claim 120, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*122. The aircraft of claim 119, wherein the machine readable-instructions include the actions comprising:*

*(f) determining whether a period of time has elapsed;*

*if the determination in action (f) determines that the period of time has elapsed, then, based at least upon the determination that the period of time has elapsed, commanding deployment of the whole-aircraft ballistic parachute even if the second output is not in the first state.*

*123. The aircraft of claim 122, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*124. The aircraft of claim 119, wherein the machine readable-instructions include the actions comprising:*

*based at least upon the receipt of the whole-aircraft ballistic parachute deployment request:*

*(i) commanding an emergency locator transmitter to transmit a signal and*

*(ii) displaying a message on a display in the aircraft.*

*125. An aircraft, the aircraft including:*

*a fuselage,*

*a whole-aircraft ballistic parachute, which includes a rocket, that is coupled to the fuselage of the aircraft,*

*an activation interface,*

*a sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) performing a first evaluation that produces a first output;*

*(b) based at least upon the first output being in a first state, then commanding deployment of the whole-aircraft ballistic parachute.*

*126. An aircraft, the aircraft including:*

*a fuselage,*

*a whole-aircraft ballistic parachute, which includes a rocket, that is coupled to the fuselage of the aircraft,*

*an activation interface,*

*a sensor,*

*an altitude sensor,*

*a roll sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the altitude sensor, at least one of the one or more processors is coupled to the roll sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*(a) performing a first evaluation that produces a first output;*

*(b) based at least upon the first output being in a first state, then commanding deployment of the whole-aircraft ballistic parachute;*

*(c) based at least upon the first output being in a second state, then:*

*(i) commanding a reduction in engine power;*

*(ii) commanding a climb; and*

*(iii) commanding a decrease in aircraft roll.*

*127. An aircraft, the aircraft including:*

*a fuselage,*

*a whole-aircraft ballistic parachute, which includes a rocket, that is coupled to the fuselage of the aircraft,*

*an activation interface,*

*a sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the sensor, at least one of the one or more processors is coupled to the aircraft engine, at least one of the one or more pro-*

*cessors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(*a*) *performing a first evaluation that produces a first output;*

(*b*) *based at least upon the first output being in a first state, then commanding deployment of the whole-aircraft ballistic parachute;*

(*c*) *based at least upon the first output being in a second state, the:*

(*i*) *commanding a reduction in engine power.*

*128. An aircraft, the aircraft including:*

*a fuselage,*

*a whole-aircraft ballistic parachute, which includes a rocket, that is coupled to the fuselage of the aircraft,*

*an activation interface,*

*an altitude sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the altitude sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(*a*) *performing a first evaluation that produces a first output;*

(*b*) *based at least upon the first output being in a first state, then commanding deployment of the whole-aircraft ballistic parachute;*

(*c*) *based at least upon the first output being in a second state, then:*

(*i*) *commanding a climb.*

*129. An aircraft, the aircraft including:*

*a fuselage,*

*a whole-aircraft ballistic parachute, which includes a rocket, that is coupled to the fuselage of the aircraft,*

*an activation interface,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(*a*) *performing a first evaluation that produces a first output;*

(*b*) *based at least upon the first output being in a first state, then commanding deployment of the whole-aircraft ballistic parachute;*

(*c*) *based at least upon the first output being in a second state, then:*

(*i*) *commanding a decrease in aircraft roll.*

*130. An aircraft, the aircraft including:*

*a fuselage,*

*a whole-aircraft ballistic parachute, which includes a rocket, that is coupled to the fuselage of the aircraft,*

*an activation interface,*

*a pitch sensor,*

*a roll sensor,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the pitch sensor, at least one of the one or more processors is coupled to the roll sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

(*a*) *performing a first evaluation that produces a first output;*

(b) based at least upon the first output being in a first state, then commanding deployment of the whole-aircraft ballistic parachute;

(c) based at least upon the first output being in a second state, then:

(i) commanding a reduction in engine power; and (ii) commanding the autopilot to decelerate the aircraft.

131. An aircraft, the aircraft including:

a fuselage, a whole-aircraft ballistic parachute, which includes a rocket, that is coupled to the fuselage of the aircraft, an activation interface, a pitch sensor, a roll sensor, an autopilot, one or more memories having machine-readable instructions stored thereon, and one or more processors, each of the one or more processors configured to read and execute a portion of the machine-readable instructions;

wherein at least one of the one or more processors is coupled to the activation interface, at least one of the one or more processors is coupled to the pitch sensor, at least one of the one or more processors is coupled to the roll sensor, at least one of the one or more processors is coupled to the autopilot, at least one of the one or more processors is coupled to the rocket, at least one of the one or more processors is coupled to the one or more memories;

the aircraft configured to perform a method comprising:

receiving, by the activation interface, a whole-aircraft ballistic parachute deployment request from an occupant of the aircraft; then based upon the receipt of the whole-aircraft ballistic parachute deployment request by the activation interface, both performing an action and also deploying the whole-aircraft ballistic parachute;

wherein the machine readable-instructions include the actions comprising:

(a) performing a first evaluation that produces a first output;

(b) based at least upon the first output being in a first state, then commanding deployment of the whole-aircraft ballistic parachute;

(c) based at least upon the first output being in a second state, then commanding the autopilot to decelerate the aircraft.

132. An aircraft, the aircraft including:

a fuselage, a whole-aircraft ballistic parachute, which includes a rocket, that is coupled to the fuselage of the aircraft, an activation interface, an altitude sensor, a roll sensor, an autopilot, an aircraft engine, one or more memories having machine-readable instructions stored thereon, and one or more processors, each of the one or more processors configured to read and execute a portion of the machine-readable instructions;

wherein at least one of the one or more processors is coupled to the activation interface, at least one of the one or more processors is coupled to the altitude sensor, at least one of the one or more processors is coupled to the roll sensor, at least one of the one or more processors is coupled to the autopilot, at least one of the one or more processors is coupled to the aircraft engine, at least one of the one or more processors is coupled to the rocket, at least one of the one or more processors is coupled to the one or more memories;

the aircraft configured to perform a method comprising:

receiving, by the activation interface, a whole-aircraft ballistic parachute deployment request from an occupant of the aircraft; then based upon the receipt of the whole-aircraft ballistic parachute deployment request by the activation interface, both performing an action and also deploying the whole-aircraft ballistic parachute;

wherein the machine readable-instructions include the actions comprising:

based at least upon the receipt of the whole-aircraft ballistic parachute deployment request:

(i) commanding a reduction in engine power;

(ii) commanding a climb; and (iii) commanding a decrease in aircraft roll.

133. An aircraft, the aircraft including:

a fuselage, a whole-aircraft ballistic parachute, which includes a rocket, that is coupled to the fuselage of the aircraft, an activation interface, an autopilot, one or more memories having machine-readable instructions stored thereon, and one or more processors, each of the one or more processors configured to read and execute a portion of the machine-readable instructions;

wherein at least one of the one or more processors is coupled to the activation interface, at least one of the one or more processors is coupled to the autopilot, at least one of the one or more processors is coupled to the rocket, at least one of the one or more processors is coupled to the one or more memories;

the aircraft configured to perform a method comprising:

receiving, by the activation interface, a whole-aircraft ballistic parachute deployment request from an occupant of the aircraft; then based upon the receipt of the whole-aircraft ballistic parachute deployment request by the activation interface, both performing an action and also deploying the whole-aircraft ballistic parachute;

wherein the machine readable-instructions include the actions comprising:

based at least upon the receipt of the whole-aircraft ballistic parachute deployment request, determining whether a period of time has elapsed;

based at least upon a determination that the period of time has elapsed, commanding deployment of the whole-aircraft ballistic parachute.

134. An aircraft, the aircraft including:

a fuselage, a whole-aircraft ballistic parachute, which includes a rocket, that is coupled to the fuselage of the aircraft, an activation interface, an airspeed sensor, an autopilot, one or more memories having machine-readable instructions stored thereon, and one or more processors, each of the one or more processors configured to read and execute a portion of the machine-readable instructions;

wherein at least one of the one or more processors is coupled to the activation interface, at least one of the

*one or more processors is coupled to the airspeed sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the actions comprising:*

*based at least upon the receipt of the whole-aircraft ballistic parachute deployment request, determining whether a period of time has elapsed;*

*based at least upon a determination that the period of time has elapsed, commanding deployment of the whole-aircraft ballistic parachute even if the aircraft exceeds a reference airspeed.*

*135. An aircraft, the aircraft including:*

*a fuselage,*

*a whole-aircraft ballistic parachute, which includes a rocket, that is coupled to the fuselage of the aircraft,*

*an activation interface,*

*an emergency locator transmitter,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the emergency locator transmitter, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the action comprising:*

*based at least upon the receipt of the whole-aircraft ballistic parachute deployment request, commanding an emergency locator transmitter to transmit a signal.*

*136. An aircraft, the aircraft including:*

*a fuselage,*

*a whole-aircraft ballistic parachute, which includes a rocket, that is coupled to the fuselage of the aircraft,*

*an activation interface,*

*an autopilot,*

*an aircraft engine,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the aircraft engine, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the action comprising:*

*based at least upon the receipt of the whole-aircraft ballistic parachute deployment request, command a reduction in engine power.*

*137. An aircraft, the aircraft including:*

*a fuselage,*

*a whole-aircraft ballistic parachute, which includes a rocket, that is coupled to the fuselage of the aircraft,*

*an activation interface,*

*a pitch sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the pitch sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the action comprising:*

*based at least upon the receipt of the whole-aircraft ballistic parachute deployment request, command the autopilot to increase aircraft pitch.*

*138. An aircraft, the aircraft including:*

*a fuselage,*

*a whole-aircraft ballistic parachute, which includes a rocket, that is coupled to the fuselage of the aircraft,*

*an activation interface,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the roll sensor, at least one of the one or more processors is coupled to*

*the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the action comprising:*

*based at least upon the receipt of the whole-aircraft ballistic parachute deployment request, command the autopilot to reduce aircraft roll.*

*139. An aircraft, the aircraft including:*

*a fuselage,*

*a whole-aircraft ballistic parachute, which includes a rocket, that is coupled to the fuselage of the aircraft,*

*an activation interface,*

*a pitch sensor,*

*a roll sensor,*

*an autopilot,*

*one or more memories having machine-readable instructions stored thereon, and*

*one or more processors, each of the one or more processors configured to read and execute a portion of the machine-readable instructions;*

*wherein at least one of the one or more processors is coupled to the activation interface, at least one of the one or more processors is coupled to the pitch sensor, at least one of the one or more processors is coupled to the roll sensor, at least one of the one or more processors is coupled to the autopilot, at least one of the one or more processors is coupled to the rocket, at least one of the one or more processors is coupled to the one or more memories;*

*the aircraft configured to perform a method comprising:*

*receiving, by the activation interface, a whole-aircraft ballistic parachute deployment request from an occupant of the aircraft; then*

*based upon the receipt of the whole-aircraft ballistic parachute deployment request by the activation interface, both performing an action and also deploying the whole-aircraft ballistic parachute;*

*wherein the machine readable-instructions include the action comprising:*

*based at least upon the receipt of the whole-aircraft ballistic parachute deployment request, command the autopilot to change the attitude of the aircraft.*

* * * * *